(12) United States Patent
Li et al.

(10) Patent No.: US 8,362,151 B2
(45) Date of Patent: *Jan. 29, 2013

(54) HYBRID POLYMER MATERIALS FOR LIQUID CRYSTAL ALIGNMENT LAYERS

(75) Inventors: Chunhong Li, Chester Springs, PA (US); Wayne Gibbons, Bear, DE (US)

(73) Assignee: Elsicon, Inc., Newark, DE (US)

( * ) Notice: Subject to any disclaimer, the term of this patent is extended or adjusted under 35 U.S.C. 154(b) by 179 days.

This patent is subject to a terminal disclaimer.

(21) Appl. No.: 12/638,983

(22) Filed: Dec. 15, 2009

(65) Prior Publication Data

US 2010/0305230 A1    Dec. 2, 2010

Related U.S. Application Data

(63) Continuation-in-part of application No. 11/183,411, filed on Jul. 18, 2005, now Pat. No. 7,632,875, which is a continuation-in-part of application No. 10/273,794, filed on Oct. 18, 2002, now Pat. No. 6,919,404, which is a continuation-in-part of application No. 10/174,132, filed on Jun. 17, 2002, now Pat. No. 6,900,271, which is a continuation-in-part of application No. 10/160,819, filed on May 31, 2002, now abandoned.

(51) Int. Cl.
| | |
|---|---|
| C08F 2/46 | (2006.01) |
| C08F 8/00 | (2006.01) |
| C08F 230/00 | (2006.01) |
| C08J 3/28 | (2006.01) |
| C08G 73/00 | (2006.01) |
| C08G 77/00 | (2006.01) |
| C08L 77/12 | (2006.01) |
| C08L 79/08 | (2006.01) |

(52) U.S. Cl. ........ 525/180; 522/116; 522/117; 522/126; 522/129; 522/130; 522/149; 522/151; 522/152; 522/153; 522/154; 522/155; 522/156; 522/157; 522/158; 522/159; 522/160; 522/161; 522/167; 522/168; 522/173; 522/174; 522/175; 522/176; 522/178; 522/179; 522/182; 525/181; 525/421; 525/422; 525/426; 525/436

(58) Field of Classification Search .......... 525/180, 525/181, 421, 422, 426, 436; 522/116, 117, 522/126, 129, 130, 149, 151, 152, 153, 154, 522/155, 156, 157, 158, 159, 160, 161, 167, 522/168, 173, 174, 175, 176, 178, 179, 182
See application file for complete search history.

(56) References Cited

U.S. PATENT DOCUMENTS

| | | | | |
|---|---|---|---|---|
| 6,900,271 B2 * | 5/2005 | Gibbons et al. | ............... | 525/180 |
| 6,919,404 B2 * | 7/2005 | Gibbons et al. | ............... | 525/180 |
| 7,632,875 B2 * | 12/2009 | Gibbons et al. | ............... | 522/113 |

* cited by examiner

*Primary Examiner* — Ana Woodward
(74) *Attorney, Agent, or Firm* — Gomez Int'l Patent Office, LLC

(57) ABSTRACT

The present invention provides novel hybrid polymer useful for alignment layers for inducing alignment of a liquid crystal medium. Hybrid polymers of this invention are prepared from a) at least one component selected from the group consisting of oligomer(s) and polymer(s) within the class of polyimides, poly(amic acids) and esters thereof wherein the at least one component comprises at least one initiator generating moiety, and b) at least one component selected from the group consisting of addition monomer(s) and addition polymer(s), wherein the two components are covalently bonded to form a copolymer. The invention further describes liquid crystal elements such as all liquid crystal display products or modes, liquid crystal devices and liquid crystal optical films comprising the novel hybrid polymer alignment layers.

12 Claims, 1 Drawing Sheet

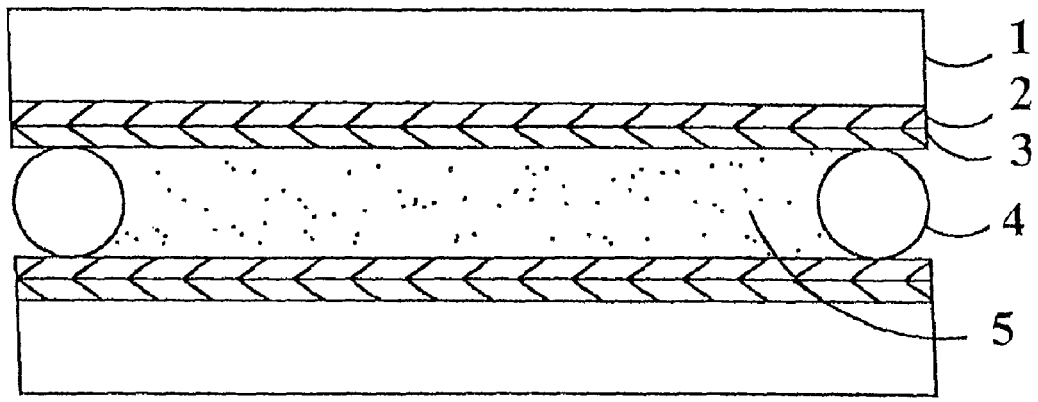

HYBRID POLYMER MATERIALS FOR LIQUID CRYSTAL ALIGNMENT LAYERS

CROSS-REFERENCE TO RELATED APPLICATION

This application is a Continuation-in-Part of Ser. No. 11/183,411, now U.S. Pat. No. 7,632,875, U.S. Publication No. US 2006-0051524, filed 18 Jul. 2005, which is a Continuation-in-Part of Ser. No. 10/273,794, filed Oct. 18, 2002, now U.S. Pat. No. 6,919,404, issued 19 Jul. 2005, which is a Continuation-in-Part of Ser. No. 10/174,132, filed Jun. 17, 2002, now U.S. Pat. 6,900,271, issued 31 May 2005, which is a Continuation-in-Part of U.S. application Ser. No. 10/160,819, filed May 31, 2002 now abandoned.

BACKGROUND OF THE INVENTION

The present invention relates to material for aligning liquid crystals, and liquid crystal optical elements such as liquid crystal displays (LCDs), liquid crystal devices and liquid crystal optical films.

Current liquid crystal displays (LCD) include a product that utilize a twisted nematic mode, i.e., having a structure wherein the aligning direction of nematic liquid crystal molecules is twisted by 90° between a pair of upper and lower substrates, a product utilizing a supertwisted nematic mode, utilizing a birefringent effect, i.e. having a structure wherein the aligning direction of nematic liquid crystal molecules is twisted by 180° to 300°, a product utilizing optically compensated bend (OCB) mode wherein the aligning direction of nematic liquid crystal molecules is parallel between a pair of upper and lower substrates, an in-plane-switching mode wherein both electrodes controlling the liquid crystal alignment are present on one substrate and the direction of the liquid crystal orientation in the plane of the substrate changes upon application of an electric field, and a product utilizing a ferroelectric liquid crystal substance or an antiferroelectric liquid crystal substance. In addition, there are LCD products that utilize the vertical alignment mode, i.e., the liquid crystal is aligned predominantly normal to the substrates (homeotropic alignment) and upon application of an electric field, the liquid crystal reorients into the plane of the alignment layer.

Many LCDs comprise one or more liquid crystal optical films to broaden the viewing angles of the displays. These optical films are called wide-viewing films, phase compensation films or optical retardation films, wherein reactive liquid crystal mesogens were first aligned on a substrate and then subsequently polymerized to form the optical films.

Common to each of these liquid crystal optical elements is a liquid crystal layer disposed on a substrate or between a pair of substrates coated with a polymeric alignment layer. The polymeric alignment layer controls the direction of alignment of the liquid crystal medium in the absence of an electric field. Usually the direction of alignment of the liquid crystal medium is established in a mechanical rubbing process wherein the polymer layer is rubbed with a cloth or other fibrous material. The liquid crystal medium contacting the rubbed surface typically aligns parallel to the mechanical rubbing direction. For the vertical alignment mode, it is desired that the liquid crystals be aligned slightly off normal to the substrates for better electro-optical performance. Mechanical rubbing, substrate protrusions or electrode geometries are used to give this alignment slightly off normal for the vertical alignment mode. Alternatively, an alignment layer can be exposed to polarized light to align a liquid crystal medium as disclosed in U.S. Pat. Nos. 5,032,009 and 4,974,941 "Process of Aligning and Realigning Liquid Crystal Media." This non-contact method of alignment is suitable for all the liquid crystal elements such as all the LCD products or modes and liquid crystal optical films mentioned previously.

The process for aligning liquid crystal media with polarized light can be a non-contact method of alignment that has the potential to reduce dust and static charge buildup on alignment layers. Other advantages of the optical alignment process include high resolution control of alignment direction and high quality of alignment.

Requirements of alignment layers for liquid crystal displays include low energy threshold for optical alignment, good mechanical properties for mechanical rubbing alignment, transparency to visible light (no color), good dielectric properties and voltage holding ratios, long-term thermal and optical stability, and in many applications a controlled uniform pre-tilt angle and uniform homeotropic alignment.

Polymers used in forming alignment layers also must have a reasonably broad processing window. Polymers used as alignment layer in commercial liquid crystal displays are generally polyimide-based systems because of their good thermal and electrical properties. One disadvantage of using polyimides in forming optical alignment layers is that they generally require high doses of polarized light (5-30 J/cm$^2$) to induce high quality optical alignment, as disclosed in U.S. Pat. No. 5,958,292. Disadvantages for requiring high doses of polarized light include low throughput in an assembly line due to increased residence time for the substrate in the exposure system, potential damage to the transistors and color filters needed in modern display systems and photodegradation of the alignment layer itself that may impair the long-term stability and performance of the device.

Photoreactive polymers other than polyimides (such as polymethacrylates and polysiloxanes) that provide satisfactory quality alignment with low doses of polarized light (0.05-5 J/cm$^2$) have been described in U.S. Pat. No. 6,224,788, "Liquid Crystal Aligning Agent and Process for Producing Liquid Crystal Alignment Film Using the Same" and U.S. Pat. No. 5,824,377 "Photosensitive Material for Orientation of Liquid Crystal Device and Liquid Crystal Device Thereof." When irradiated with polarized light, these materials undergo photo-crosslinking to produce optical alignment layers. Advantages of these polymers include higher mobility of the polymer backbone leading to more efficient photo-crosslinking reactions and higher densities of photoreactive groups due to the smaller repeat unit for the polymer. The high density and high mobility of photoreactive groups leads to the requirement of lower doses of polarized light for good alignment. However, the listed physical features that provide advantages in the optical density thresholds can provide for reduced electrical performance and optical stability of devices. In, for example, a thin film transistor TN display, this can result in an inadequate voltage holding ratio (VHR, a measure of the voltage drop in the display after the supplied electrical field has been switched off).

An approach to incorporating multiple desired properties (such as improving VHR) of materials for optical alignment layers is described in WO 99/49360 "Liquid Crystal Orientation Layer" and WO 01/72871 A1 "Polymer Blend for Preparing Liquid Crystal Alignment Layer." Blends of polymeric compounds containing photoreactive polymers (typically non-polyimide) and polyimides are proposed as a method to improve the inadequate VHR of the non-polyimide by blending with material having high VHR (typically a polyimide). The blends have the disadvantage of limited miscibility and, thus, limit the quantity of photoreactive material available for alignment.

An approach to incorporating multiple desired properties into a polyimide for conventional liquid crystal alignment layers has been described in U.S. Pat. No. 5,773,559 "Polyimide Block Copolymer and Liquid Crystal Alignment Layer Forming Agent". In this process, polyimide block copolymers, wherein a polyimide-type block is copolymerized with a different polyimide-type block, are described which provide multiple properties that are difficult to obtain by conventional polyimide synthesis.

Copolymerization of related or similar type of monomers or polymers is well known in the art. Less well known is the polymerization of different types or unrelated monomers or polymers to form copolymers such as between condensation type of monomers or polymers and addition type of monomers or polymers, particularly between polyimide-type polymers and addition-type polymers. Curable compositions of polyimides containing reactive double-bonds combined with crosslinking reagents such as tetraethylene glycol diacrylate for use in electronic or optical components have been described in, for example, U.S. Pat. No. 4,778,859. These materials form a cross-linked matrix during cure conditions; however the architecture of the matrix that is formed is not known and cannot be controlled. Hedrick et al (Advances in Polymer Science, Vol 141, 1999, pg 1-43 and references therein) describes the synthesis of ABA triblock and graft copolymers for the preparation of foamed polyimides. In the case of the ABA triblock copolymers, the polyimide block is terminated by amine terminated oligomers of poly(styrenes), poly(methylmethacrylates) and polypropylene oxides). In the case of the graft copolymers, the oligomers are terminated with diamines. These materials are specifically designed to undergo microphase separation between the thermally stabile polyimide blocks and the thermally labile oligomer blocks. Upon heating, the thermally labile oligomer blocks decompose, leaving nanometer size pores in the structure. U.S. Pat. No. 4,539,342 "Polyimide Foam Prepared from Amino Terminated Butadiene Acrylonitrile Reactant" describes a polyimide foam wherein one of the components is an amine-terminated butadiene-acrylonitrile copolymer. The described materials are known in the art as segmented block copolymers and provide foams that are flexible and resilient and provide high vapor-barrier characteristics. Similarly, U.S. Pat. No. 4,157,430 "Amine Terminated Polymers and the Formation of Block Copolymers" describes the synthesis of amine terminated butadiene polymers for the formation of block copolymers as thermoset rigid foams. The authors describe, but do not teach, the concept of copolymers with polyimides. However, microphase separation and polyimide foam characteristics, common features to the aforementioned papers and patents, are not desirable properties used in materials for liquid crystal alignment layers.

In further developing materials and processes for optical alignment layers, we have invented novel copolymers comprising units from addition polymers and condensation polymers such as polyimides and polyamic acids, which are described herein. These new materials for alignment layers were invented to remove or reduce the disadvantages of optical alignment layers described previously. We refer to this new class of polymers as hybrid polymers. In addition, we have discovered that the hybrid polymers are suitable as alignment materials for LCDs that utilize mechanical rubbing, substrate protrusions or electrode geometries to align the liquid crystals in either homogeneous or homeotropic alignment. For these applications, it is not a requirement that the hybrid polymers be photoreactive. These hybrid polymers are prepared from at least one component selected from the group consisting of oligomer and polymer within the class of polyimides, poly(amic acids) and esters thereof and at least one component selected from the group consisting of addition monomer and addition polymer wherein the two components are covalently bonded to form a copolymer. This novel class of new, hybrid polymers combines multiple desired properties such as the good thermal and electrical properties of polyimides with the high density and high mobility advantages of addition polymers such as polymethacrylates, polyacrylates, polyolefins and polystyrenes. In this way, multiple desirable properties that are difficult to obtain by other materials and processes can be achieved.

SUMMARY OF INVENTION

The present invention describes the composition of a hybrid polymer which is useful, especially as a liquid crystal alignment layer for liquid crystal optical elements such as all LCD products or modes including vertical alignment LCDs, and optical films for phase compensation and, in particular, optical alignment layer, and provides a plurality of desirable properties. Hybrid polymers of this invention are prepared from (a) at least one component selected from the group consisting of oligomer(s) and polymer(s) within the class of polyimides, poly(amic acids) and esters thereof wherein the at least one component comprises at least one initiator generating moiety and (b) at least one component selected from the group consisting of addition monomer(s) and addition polymer(s) wherein the at least one initiator generating moiety of component (a) initiates chain polymerization with at least one component (b) to form a copolymer.

A first embodiment of the invention is a hybrid polymer that is prepared from (a) at least one component selected from the group consisting of oligomer(s) and polymer(s) within the class of polyimides, poly(amic acids) and esters thereof wherein the at least one component comprises at least one initiator generating moiety, and (b) at least one component selected from the group consisting of addition monomer(s) and addition polymer(s); wherein the at least one initiator generating moiety of component (a) initiates chain polymerization with at least one component (b) to form a copolymer.

A second embodiment of the invention is a hybrid polymer that is prepared from (a) at least one component selected from the group consisting of oligomer(s) and polymer(s) within the class of polyimides, poly(amic acids) and esters thereof wherein the at least one component comprises at least one initiator generating moiety and at least one addition polymerization moiety, and (b) at least one component selected from the group consisting of addition monomer(s) and addition polymer(s) wherein the at least one initiator generating moiety of component (a) initiates chain polymerization with at least one component (b) to form a copolymer.

A third embodiment of the invention is a hybrid polymer that is prepared from (a) at least one component selected from the group consisting of oligomer(s) and polymer(s) within the class of polyimides, poly(amic acids) and esters thereof wherein the at least one component comprises at least one initiator generating moiety and optionally at least one addition polymerization moiety, and (b) at least one component selected from the group consisting of addition monomer(s) and addition polymer(s); wherein the at least one initiator generating moiety of component (a) initiates chain polymerization with at least one component (b) to form a copolymer; and wherein the chain polymerization initiation of the at least one initiator generating moiety is induced thermally, by light (ultravioliet, visible or infrared), electron beam, ion beam, gamma ray or plasma.

A fourth embodiment of the invention is a hybrid polymer that is prepared from (a) at least one component selected from the group consisting of oligomer(s) and polymer(s) within the class of polyimides, poly(amic acids) and esters thereof wherein the at least one component comprises at least one initiator generating moiety and optionally at least one addition polymerization moiety, and (b) at least one component selected from the group consisting of addition monomer(s) and addition polymer(s); wherein the at least one component (a) and/or the at least one component (b) comprises at least one selected from the group consisting of C4-C24 alkyl chain, C4-C20 fluoroalkyl chain, C4-C20 partially fluorinated alkyl chain and steroidal group; whereas at least one initiator generating moiety of component (a) initiates chain polymerization with at least one component (b) to form copolymer.

A fifth embodiment of the invention is a hybrid polymer that is prepared from (a) at least one component selected from the group consisting of oligomer(s) and polymer(s) within the class of polyimides, poly(amic acids) and esters thereof wherein the at least one component comprises at least one initiator generating moiety and optionally at least one addition polymerization moiety, and (b) at least one component selected from the group consisting of addition monomer(s) and addition polymer(s); wherein the at least one component (b) comprises one or more photoreactive groups capable of forming a covalent bond after exposure to light; whereas at least one initiator generating moiety of component (a) initiates chain polymerization with at least one component (b) to form copolymer.

A sixth embodiment of the invention is a hybrid polymer that is prepared from (a) at least one component selected from the group consisting of oligomer(s) and polymer(s) within the class of polyimides, poly(amic acids) and esters thereof wherein the at least one component comprises at least one initiator generating moiety and at least one addition polymerization moiety, and (b) at least one component selected from the group consisting of addition monomer(s) and addition polymer(s); wherein the at least one component (b) comprises at least one selected from the group consisting of 3-arylacrylic esters (cinnamates) and derivatives, chalcones and derivatives, coumarin and derivatives and phenyl butenones and derivatives; whereas at least one initiator generating moiety of component (a) initiates chain polymerization with at least one component (b) to form copolymer.

The invention further embodies alignment layers prepared from the hybrid polymers and liquid crystal displays incorporating the alignment layers, liquid crystal devices incorporating the alignment layers, and optical films of polymerized liquid crystals or reactive mesogens aligned by the alignment layers.

BRIEF DESCRIPTION OF DRAWINGS

FIG. 1 is a cross-sectional view of a liquid crystal display element.

DETAILED DESCRIPTION OF THE INVENTION

As used herein, the term "alignment layer" is the layer of material that controls the alignment of liquid crystals in the absence of an external field and often adheres to the surface of a substrate. The term "substrate" as referred to herein means any material that is an alignment layer or has an alignment layer adhered to it. A "conventional alignment layer" herein refers to an alignment layer that will only align a liquid crystal layer via processing other than optical means. For example, mechanically rubbed polyimides, evaporated silicon dioxide, Langmuir-Blodgett films, have all been shown to align liquid crystals. A "vertical alignment layer" herein refers to a conventional or optical alignment layer that will align liquid crystals approximately normal to the substrate.

"Optical alignment layer" herein refers to an alignment layer that will induce alignment of liquid crystals after exposure with light. The optical alignment layer can be an isotropic medium or have some degree of anisotropy before optical alignment. The composition of a conventional alignment layer can be the same as an optical alignment layer and vice versa. The difference between a conventional and optical alignment layer lies in what processes are used to cause alignment of liquid crystals. Optical alignment layers of the invention may be processed by conventional means, such as mechanical rubbing, prior to or after exposure to light. The optical alignment layers exhibit light absorption properties with absorption bands between 150 nm and about 2000 nm. Most preferable optical alignment layers for the present invention have absorbance maxima of about from 150 to 400 nm and especially about from 250 to 400 nm.

"Addition monomers" are herein defined as monomer units with a monoreactive group used in the preparation of addition polymers or copolymers. By "addition polymer or copolymers" we mean chain-growth polymers as distinct from step-growth polymers (see, for example, discussions in "Principles of Polymerization" $2^{nd}$ Edition, George Odian, John Wiley and Sons, New York (1981).).

A "functionalized addition monomer" of the invention is herein defined as an addition monomer used in the preparation of addition polymers or copolymers that contains at least one functionalized moiety. These functionalized moieties may include, but are not limited to, amines, diamines, anhydrides, dianhydrides, isocyanates and acid chlorides.

A "functionalized addition polymer" of the invention is herein referred to as an addition oligomer or polymer that contains one or more functionalized moieties. These functionalized moieties may include, but are not limited to, amines, diamines, anhydrides, dianhydrides, isocyanates, methacrylates, acrylates, methacrylamides, acrylamides, olefins, vinyls, styrenes, maleimides, norbornenes, and acid chlorides. A "pre-functionalized addition polymer" of the invention is herein defined as an addition oligomer or polymer that contains at least one group that can be modified to give a functionalized addition polymer. "Functionalized" is not meant to restrict the moieties on the monomers, oligomers or polymers to a specific mode of action. Rather, the term is meant to suggest to the artisan how the moieties on the monomers, oligomers or polymers may perform their function. The invention is not restricted to a specific mechanism of action in order to synthesize the desired hybrid polymer.

"Addition polymerization moiety" or "addition polymerization moieties" are one or more reactive groups covalently bonded to oligomer(s) and/or polymer(s) that can undergo addition polymerization with addition monomer(s) and/or addition polymer(s). Typical Addition polymerization moiety may include but not limited to vinyl groups By "addition polymerization" we mean chain transfer or chain growth polymerization as distinct from step-growth polymerization (see, for example, discussions in "Principles of Polymerization" $2^{nd}$ Edition, George Odian, John Wiley and Sons, New York (1981).).

"Initiator generating moiety" or "initiator generating moieties" are one or more groups that can undergo chain scission to generate initiator species with a reactive center, including free radicals, cations and anions, capable of initiating chain polymerization. Typical initiator generating moieties may include but not limited to azo compounds and organic peroxides.

A "branched copolymer" of the invention is herein referred to as a copolymer where the backbone contains one or more branch points.

A "hybrid polymer" of the invention is herein referred to as a polymer prepared from (a) at least one component selected from the group consisting of oligomer(s) and polymer(s) within the class of polyimides, poly(amic acids) and esters thereof wherein the at least one component comprises at least one initiator generating moiety; and (b) at least one component selected from the group consisting of addition monomer(s) and addition polymer(s); wherein the at least one initiator generating moiety of component (a) initiates chain polymerization with at least one component (b) to form a copolymer.

Polymers especially useful as alignment layers are polyimides. Polyimides are known for their excellent thermal and electrical stability properties and these properties are useful in optical alignment layers for liquid crystal displays. The preparation of polyimides is described in "Polyimides", D. Wilson, H. D. Stenzenberger, and P. M. Hergenrother Eds., Chapman and Hall, New York (1990). Typically polyimides are prepared by the condensation of one equivalent of a diamine with one equivalent of a dianhydride in a polar solvent to give a poly(amic acid) prepolymer intermediate. Copolymer polyimides are materials prepared by the condensation of one or more diamines with one or more dianhydrides to give a copoly(amic acid).

An alternative intermediate to polyimides are poly(amic esters) that can be made by esterification of poly(amic acids) with alcohols. The poly(amic esters) undergo thermal imidization to form polyimides. Thus, poly(amic acids) and poly(amic esters) are considered to be very closely related precursors to polyimides used in the invention. Therefore, poly(amic acids) and poly(amic esters) are considered useful for this invention. Furthermore, preimidized polyimides derived from chemical or thermal imidization of poly(amic acids) or poly(amic esters) are also considered useful for the invention. The novel polymers of the invention are hybrid polymers that comprise 5-95% or more preferably 25-75% of polymer within the class of polyimides, poly(amic acids) and esters thereof A wide variety of dianhydrides may be useful in the preparation of novel hybrid polymers of the invention. Specific examples of tetracarboxylic dianhydride components include aromatic dianhydrides such as 3,3',4,4'-benzophenonetetracarboxylic dianhydride, pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 3,3'4,4'-biphenyltetracarboxylic dianhydride, 2,3,2',3'-biphenyltetracarboxylic dianhydride, bis(3,4-dicarboxyphenyl)ether dianhydride, bis(3,4-dicarboxyphenyl)diphenylsulfone dianhydride, bis(3,4-dicarboxyphenyl)methane dianhydride, 2,2-bis(3,4-dicarboxyphenyl)propane dianhydride, 1,1,1,3,3,3-hexafluoro-2,2-bis(3,4-dicarboxyphenyl)propane dianhydride, bis(3,4-dicarboxyphenyl)dimethylsilane dianhydride, 2,3,4,5-pyridinetetracarboxylic dianhydride; alicyclic tetracarboxylic dianhydrides such as 1,2,3,4-butanetetracarboxylic dianhydride, 1,2,3,4-cyclobutanetetracarboxylic dianhydride, 1,2,3,4-cyclopentanetetracarboxylic dianhydride, 1,2,4,5-cyclohexanetetracarboxylic dianhydride, 2,3,5-tricarboxycyclopentylacetic acid dianhydride, 3,4-dicarboxy-1,2,3,4-tetrahydro-1-naphthalenesuccinic dianhydride and dianhydride 5-(2,5-dioxotetrahydrol)-3-methyl-3-cyclohexen-1,2-dicarboxylic anhydride; and their acid and acid chloride derivatives. Preferred dianhydrides are 1,2,3,4-cyclobutanetetracarboxylic dianhydride, and 1,2,3,4-cyclopentanetetracarboxylic dianhydride. The most preferred dianhydride is 1,2,3,4-cyclobutanetetracarboxylic dianhydride.

Dianhydride has the following general structure:

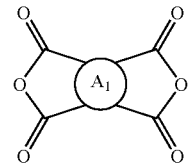

wherein $A_1$ is a cyclic or acyclic radical.

Examples of monoanhydrides that may be used in preparing hybrid polymers of the invention include maleic anhydride, dimethyl maleic anhydride, citraconic anhydride, cis-5-norbornene-endo-2,3-dicarboxylic anhydride, cis-5-norbornene-exo-2,3-dicarboxylic anhydride, methyl-5-norbornene-2,3-dicarboxylic anhydride, endo-bicyclo[2.2.2]oct-5-ene-2,3-dicarboxylic anhydride, 1-methyl-5-cyclohexene-2,3-dicarboxylic anhydride, cis-1,2,3,6-tetrahydrophthalic anhydride, cis-4-methyl-1,2,3,6-tetrahydrophthalic anhydride, and exo-3,6-epoxy-1,2,3,6-tetrahydrophthalic anhydride.

Monoanhydride has the following general structure:

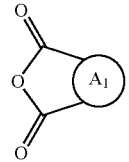

wherein $A_1$ is a cyclic or acyclic radical.

A variety of diamines may be useful in the preparation of novel hybrid polymers of the invention including aromatic diamines such as 2,5-diaminobenzonitrile, 2-(trifluoromethyl)-1,4-benzenediamine, p-phenylenediamine, 2-chloro-1,4-benzenediamine, 2-fluoro-1,4-benzenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl)methane, diaminodiphenylsulfone, diaminonaphthalene, 1,4-bis(4-aminophenoxy)benzene, 4,4'-diaminobenzophenone, 3,4'-diaminobenzophenone, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane, 2,4,6-trimethyl-1,3-phenylenediamine and 2,2-bis[4-(4-aminophenoxy)phenyl]hexafluoropropane; alicyclic diamines such as bis(4-aminocyclohexyl)methane; and aliphatic diamines such as tetramethylenediamine and hexamethylene diamine. Further, diaminosiloxanes such as bis(3-aminopropyl)tetramethyldisiloxane may be used. Such diamines may be used alone or in combination as a mixture of two or more of them. Preferred diamines for preparing hybrid polymers are bis(4-aminocyclohexyl)methane, 4,4'-methylenebis(2-methylcyclohexylamine), N,N-dipropyl-benzene-1,2,4-triamine, 2-(N,N-diallylamino)-1,4-benzenediamine, 1-(N,N-diallylamino)-2,4-benzenediamine, 1-[4-vinylphenoxy]-2,5-benzenediamine, 1-[4-vinylphenoxy]-2,4-benzenediamine, N2,N2-diallyl-biphenyl-2,4,4'-triamine and 2,4,6-trimethyl-1,3-phenylenediamine.

Diamine has the following general structure:

wherein $A_0$ is a cyclic or acyclic radical.

Preferred diamines that can be used in preparing hybrid polymers have the structure

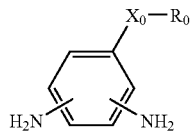

Wherein $R_0$ is a cyclic or acyclic radical with less than 40 carbon atoms comprising at least one C=C double bond; $X_0$ is selected from a single covalent bond, —O—, —S—, —NR—, wherein R is selected from hydrogen, $R_0$ and alkyl of less than 40 carbon atoms.

Most preferred diamines that can be used in preparing hybrid polymers are shown in Table 1.

TABLE 1

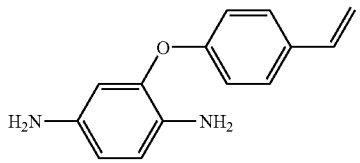 [SMILES: C=Cc1ccc(Oc2cc(N)ccc2N)cc1]

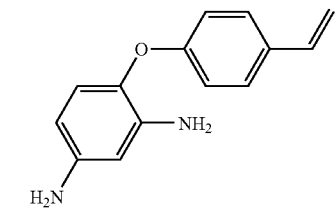 [SMILES: C=Cc1ccc(Oc2ccc(N)cc2N)cc1]

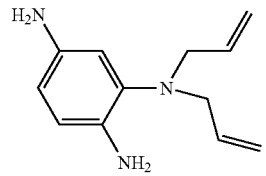

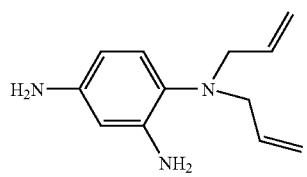

Monoamine has the following general structure:

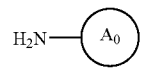

wherein $A_0$ is a cyclic or acyclic radical.

Preferred monoamines that can be used in preparing hybrid polymers have the structure

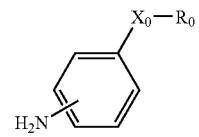

Wherein $R_0$ is a cyclic or acyclic radical with less than 40 carbon atoms comprising at least one C$\alpha$C double bond; $X_0$ is selected from a single covalent bond, —O—, —S—, —NR—, wherein R is selected from hydrogen, $R_0$ and alkyl of less than 40 carbon atoms. More preferred monoamines that can be used in preparing hybrid polymers include 3-vinyl aniline, 4-vinyl aniline and allyl amine. The most preferred monoamine is 4-vinyl aniline.

Various initiators can be covalently incorporated into oligomer(s) and/or polymer(s) as the initiator generating moiety. These oligomer(s) and/or polymer(s) can produce radical species under mild conditions and initiate chain polymerization reactions. Typical examples are azo compounds (R'-N=N—R") and organic peroxides (R'-O—O—R"), where R' and R" represent any organic groups compatible with azo (—N=N—) or peroxide (—O—O—) functional groups.

Preferred initiators that can be covalently incorporated into oligomer(s) and/or polymer(s) as the initiator generating moiety have the structure

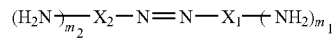

wherein
$X_1$, $X_2$ represent mono- or multi-valent organic groups optionally substituted with fluorine, chlorine, cyano, alkyl, fluoroalkyl, alkyoxy; $m_1$, $m_2$ are integral numbers between 0, 1 and 2 and $m_1+m_2 \geq 1$.

More preferred initiators that can be covalently incorporated into oligomer(s) and/or polymer(s) as the initiator generating moiety have the structure

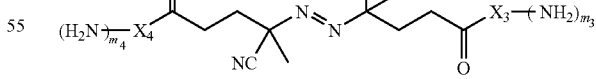

wherein
$X_3$, $X_4$ represent mono- or multi-valent organic groups optionally substituted with fluorine, chlorine, cyano, alkyl, fluoroalkyl, alkyoxy; $m_3$, $m_4$ are integral numbers between 0, 1 and 2 and $m_3+m_4 \geq 1$.

When initiators do not contain the requisite functional groups for the incorporation into oligomer(s) and/or polymer(s), the so-called Pre-Functionalized Initiator(s), they can be derivatized to meet the functional requirements in practice.

For example, 4,4′-azobis(4-cyanovaleric acid) can be conveniently derivatized as amino-containing initiator to react with various dianhydrides. Those skilled in the art will recognize that by proper derivatization, there are numerous azo and peroxide compounds that could be incorporated into oligomer(s) and/or polymer(s) to provide the necessary initiator generating moiety. Most preferred amino-containing initiator has the following structures

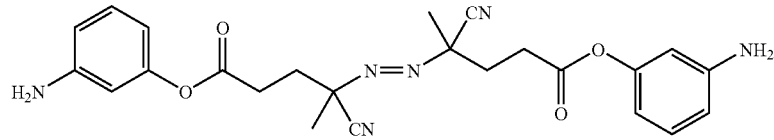 [SMILES: CC(C#N)(CCC(=O)Oc1cccc(N)c1)/N=N/C(C)(C#N)CCC(=O)Oc1cccc(N)c1]

The novel polymers of the invention are hybrid polymers that comprise 5-95% or more preferably 25-75% of polymer within the class of addition polymers, including, but not limited to, polymethacrylates, polyacrylates, polystyrenes, polynorbornenes, polyolefins, and polyacrylamides. The addition polymer portion of the hybrid polymer can impart desired properties to the polyimide portion, such as stable pre-tilt and/or good optical alignment at low levels of irradiation.

A wide variety of addition monomers and addition polymers may be useful in the preparation of novel hybrid polymers of the invention. Preferred addition monomers and addition polymers that lead to improved optical alignment qualities of liquid crystal displays are those comprising at least one formula selected from the group consisting of I, II and III,

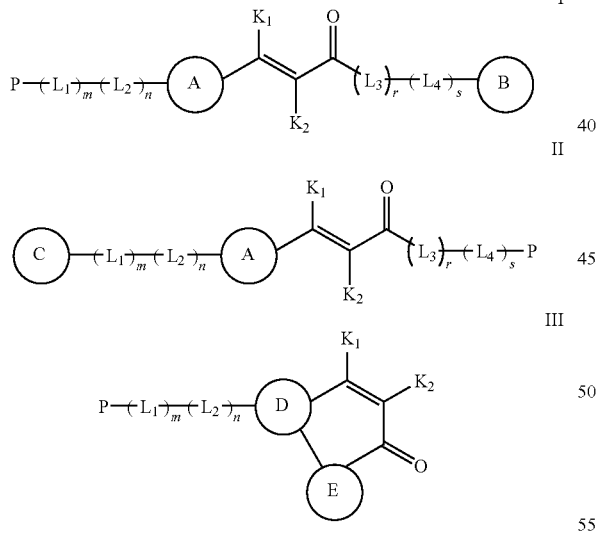

wherein

Ⓐ is an aromatic radical of less than 40 carbon atoms, comprising at least one selected from the group consisting of phenylene, substituted phenylene, and bivalent radicals derived from biphenyl, naphthalene and their substituted derivatives.

Ⓑ, Ⓒ are each independently selected from -$T_4$, —$OT_4$, and —$NT_4T_5$,

Ⓓ is a trivalent aromatic radical of less than 40 carbon atoms, derived from benzene, biphenyl, naphthalene and their substituted derivatives.

Ⓔ is selected from —O— and —$NT_5$—,

P indicates the monomer unit of the addition polymer, comprising at least one selected from the group consisting of acryloyl, methacryloyl, 2-chloroacryloyl, vinyl and substituted vinyl;

$L_1$, $L_2$, $L_3$ and $L_4$ are -$G_1(T_3)_w G_2$-, $G_1$ and $G_2$ are each independently selected from:
a single covalent bond, —O—, —$NT_1$—, —C(O)O—, —OC(O)—, —OC(O)O—, —$NT_1$C(O)—, —$NT_1$C(O)O—, —OC(O)$NT_1$— and —$NT_1$C(O)$NT_2$-;

$K_1$, $K_2$, $T_1$, $T_2$, $T_4$ and $T_5$ are each independently hydrogen or a univalent radical comprising at least one selected from the group consisting of alkyl, alkenyl, aryl, fluoroalkyl and partially fluorinated alkyl of less than 25 carbon atoms each and their combinations, $T_3$ is a bivalent radical comprising at least one selected from the group consisting of alkyl, alkenyl, aryl, fluoroalkyl and partially fluorinated alkyl of less than 25 carbon atoms each and their combinations; and w, m, n, r, s are each independently a whole number from 0 to 10.

More preferred addition monomers and addition polymers that lead to improved optical alignment qualities of liquid crystal displays are those comprising one or more photoreactive groups capable of forming a covalent bond after exposure to light, such as via photo-crosslinking or dimerization. The photoreactive group comprises at least one selected from the group consisting of 3-arylacrylic esters (cinnamates) and derivatives, chalcones and derivatives, coumarin and derivatives and phenyl butenones and derivatives as shown in Table 2. Examples of the preferred addition monomers that are useful for the invention are further described in the following publications: U.S. Pat. No. 6,335,409 B1 (cinnamates), U.S. Pat. No. 6,224,788 (chalcones) and Jackson et al in *Chem. Mater.* (2001) 13, p 694-703 (coumarins).

TABLE 2

| | |
|---|---|
| cinnamate | 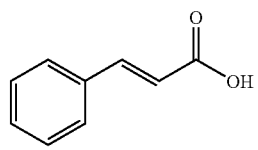 [SMILES: O=C(O)/C=C/c1ccccc1] |
| chalcone | 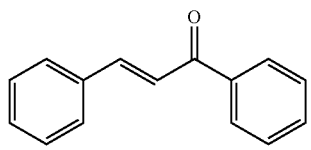 [SMILES: O=C(/C=C/c1ccccc1)c1ccccc1] |
| coumarin | 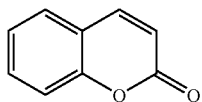 [SMILES: O=c1ccc2ccccc2o1] |

TABLE 2-continued

| | |
|---|---|
| phenylbutenone | 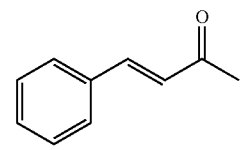 |

Most preferred addition monomers are shown in Table 3. When irradiated with light, preferably polarized light, the hybrid polymers prepared from these monomers can undergo photo-crosslinking or dimerization to produce optical alignment layers. In some instances uncrosslinked and crosslinked sites can establish pre-tilt in liquid crystal molecules in contact with the optical alignment layer.

TABLE 3

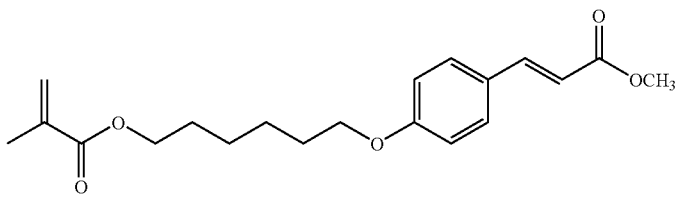 [SMILES: C=C(C)C(=O)OCCCCCCOc1ccc(/C=C/C(=O)OC)cc1]

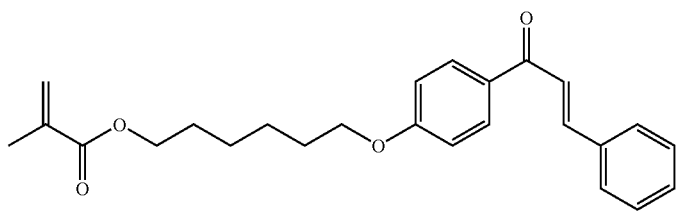 [SMILES: C=C(C)C(=O)OCCCCCCOc1ccc(C(=O)/C=C/c2ccccc2)cc1]

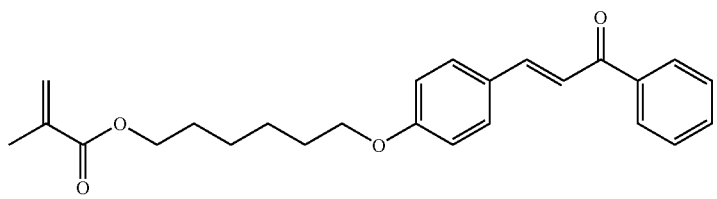 [SMILES: C=C(C)C(=O)OCCCCCCOc1ccc(/C=C/C(=O)c2ccccc2)cc1]

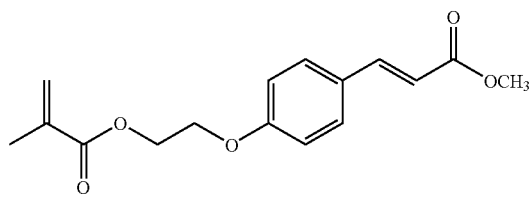 [SMILES: C=C(C)C(=O)OCCOc1ccc(/C=C/C(=O)OC)cc1]

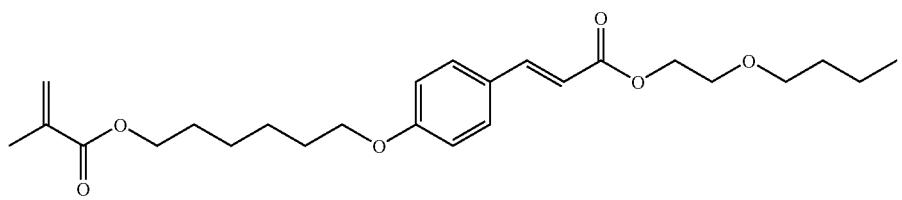 [SMILES: C=C(C)C(=O)OCCCCCCOc1ccc(/C=C/C(=O)OCCOCCCC)cc1]

TABLE 3-continued

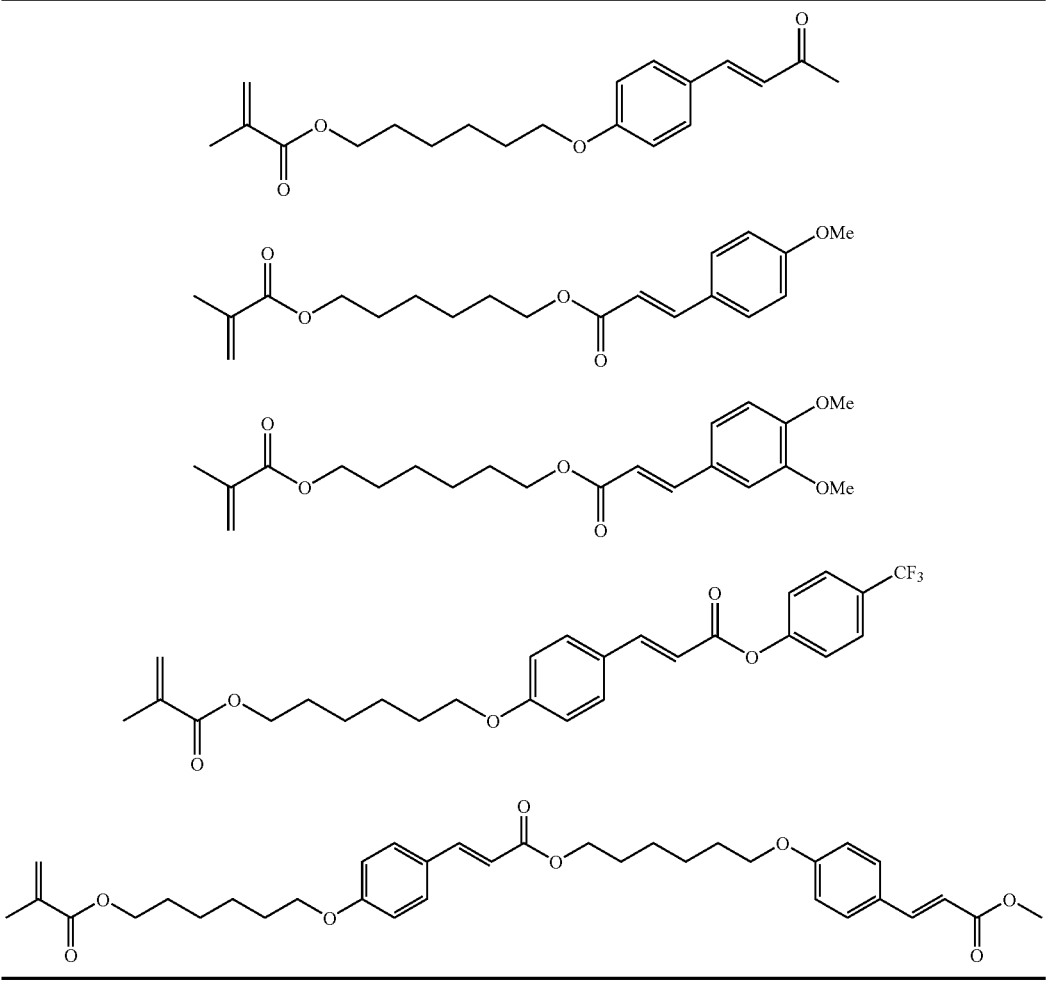

Most liquid crystal devices, including displays, have a finite pre-tilt angle, controlled, for instance, by the mechanical rubbing of selected polymeric alignment layers. The liquid crystal molecule in contact with such a layer aligns along the rubbing direction, but is not exactly parallel to the substrate. For many LCD modes, the liquid crystal molecules are slightly tilted from the substrate, for instance by about 0.5-15 degrees. For the vertical alignment mode, the tilt is 90 degrees or near 90 degrees, for instance about 80-89.9 degrees. For optimum performance in most display applications a finite and uniform pre-tilt angle of the liquid crystal is desirable. Several approaches have been explored to add pre-tilt to alignment layers for liquid crystal displays. One approach is the incorporation of side groups comprising long alkyl chains in polyimide forming alignment layers, as described in U.S. Pat. No. 5,858,274. A second approach described in U.S. Pat. No. 5,731,405, are optical alignment layers formed with polyimide having side groups comprising C4-C20 fluorinated or partially fluorinated alkyl chains. A third approach described in U.S. Pat. No. 5,276,132, are polyamic acids and polyimides containing steroidal side groups. Preferred addition monomers or functionalized addition polymers of the invention that produce alignment layers with a defined angle of pre-tilt or tilt comprises at least one selected from the group consisting of C4-C24 alkyl chain (branched or linear), C4-C20 fluoroalkyl chain, C4-C20 partially fluorinated alkyl chain and steroidal group. Some other preferred addition monomers functionalized addition monomers or addition polymers of the invention that produce alignment layers or optical alignment layers with a defined angle of pre-tilt or tilt also comprises at least one selected from the group consisting of C4-C24 alkyl chain, C4-C20 fluoroalkyl chain, C4-C20 partially fluorinated alkyl chain and steroidal group.

Mechanical rubbing or optical alignment can be used with vertical alignment layers to induce a pre-tilt slightly off normal. However, mechanical rubbing or optical alignment methods are not necessarily required for vertical alignment layers, instead substrate protrusions or electrode geometries have been used with the alignment layer to induce a pre-tilt slightly off normal. Vertical alignment layers are used with vertical alignment liquid crystals, for example, MLC-6608 (EM Industries, Hawthorne, N.Y.) in order to get the desired change in optical properties when a voltage is applied. Preferred addition monomers of the invention that produce vertical alignment layers comprise at least one selected from the group consisting of C4-C24 alkyl chain, C4-C20 fluoroalkyl chain, C4-C20 partially fluorinated alkyl chain and steroidal group. Table 4 shows examples of most preferred addition monomers that can be used in the preparation of the hybrid polymers of the invention useful for alignment layers that induce a uniform angle of pre-tilt. One who is skilled in the art will realize that there are a great variety of addition monomers and addition polymers that can impart these and other properties that will be useful to the invention.

TABLE 4
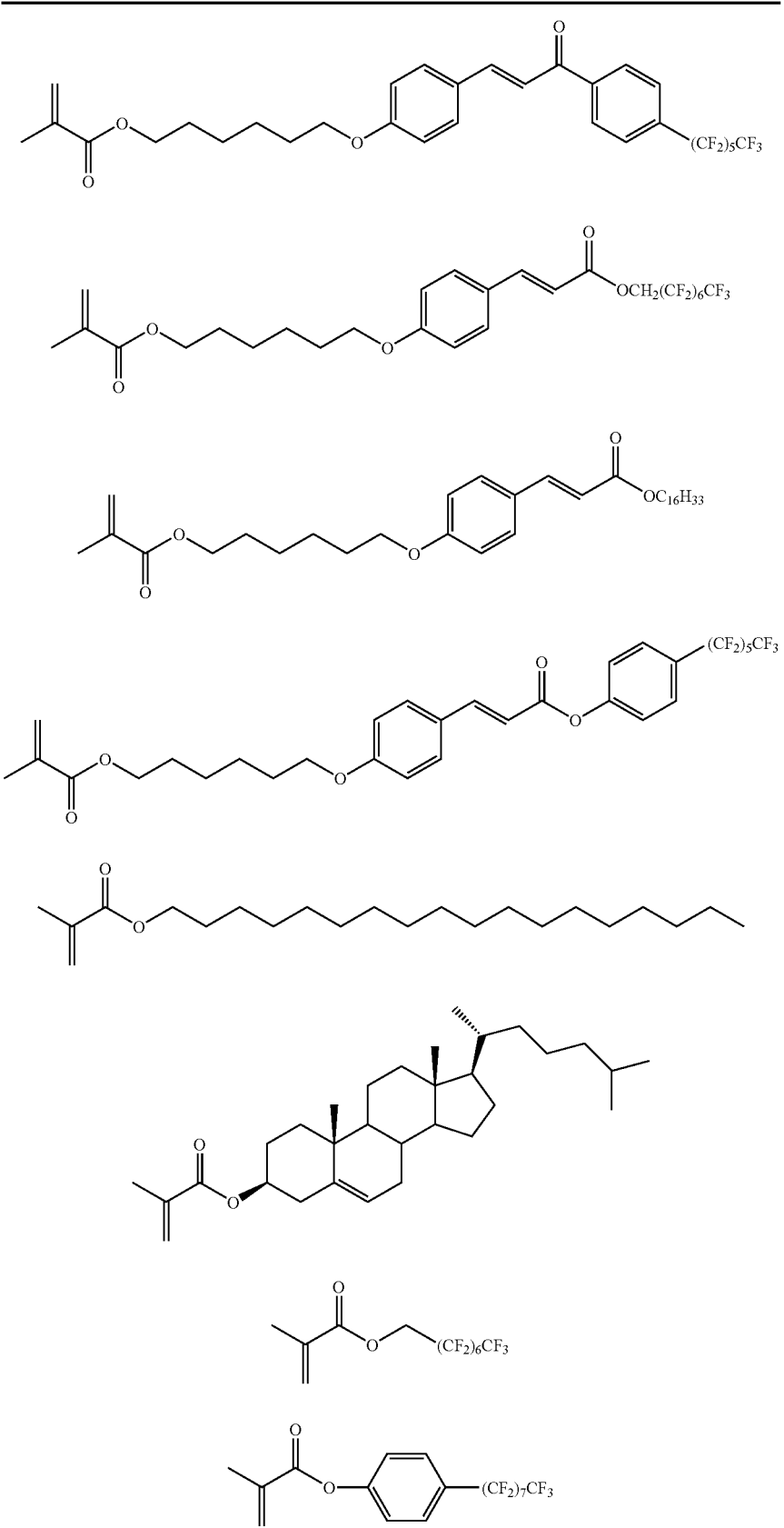

TABLE 4-continued

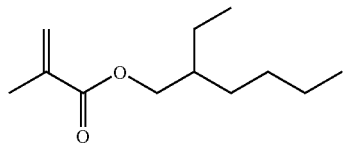

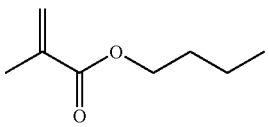

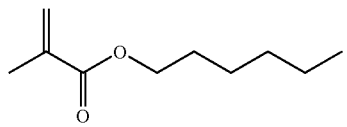

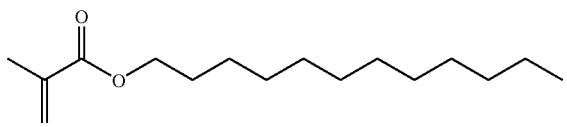 [SMILES: C=C(C)C(=O)OCCCCCCCCCCCC]

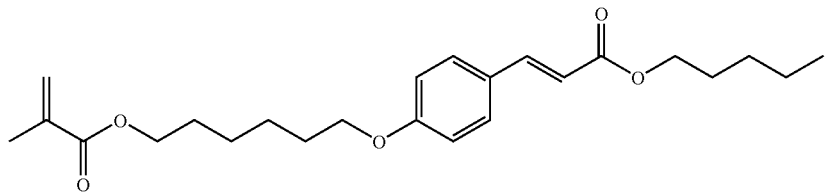 [SMILES: C=C(C)C(=O)OCCCCCCOc1ccc(/C=C/C(=O)OCCCCC)cc1]

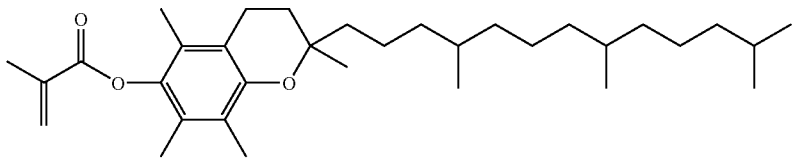 [SMILES: C=C(C)C(=O)Oc1c(C)c(C)c2c(c1C)CCC(C)(CCCC(C)CCCC(C)CCCC(C)C)O2]

The novel polymers of this invention can be prepared by the following general approaches described herein: These methods are meant to exemplify various approaches to preparing the hybrid polymers and are not meant to limit the scope of the invention.

Hybrid polymers are prepared from polyamic acid (PAA) and addition monomers in weight ratios desired. Unlike most traditional grafting approaches, the radical initiator in this process is incorporated in PAA backbone. Grafting reaction originates from the PAA backbone and the yield for the hybrid polymer is good making it a viable process for the mass production of this type of hybrid polymers.

A PAA, as described by the general formula 1, is prepared incorporating addition polymerization moieties in the side groups of either the diamine/monoamine or dianhydride monomers. Preferred PAA of the invention are prepared from either diamines/monoamines or dianhydrides with side groups containing allyl groups and derivatives, vinyl groups and derivatives, styrenes and derivatives, maleimides or maleic anhydrides and derivatives and norbornenes and derivatives. Most preferred PAA of the invention are prepared using one or more diamines shown in Table 1. Preferred novel PAA of the invention contain 1-100 mol % monomers incorporating addition polymerization moieties in the side group, and most preferred is 1-50 mol %.

The PAA is subsequently polymerized with the addition monomer 2 to yield hybrid polymers. The preferred monoreactive groups on the addition monomers of the invention independently include, but are not limited to: methacrylates and derivatives, acrylates and derivatives, methacrylamides and derivatives, acrylamides and derivatives, allyl groups and derivatives, vinyl groups and derivatives, styrenes and derivatives, maleimides or maleic anhydrides and derivatives and norbornenes and derivatives. Most preferred monoreactive groups on the addition monomers of the invention include methacrylates and derivatives and acrylates and derivatives.

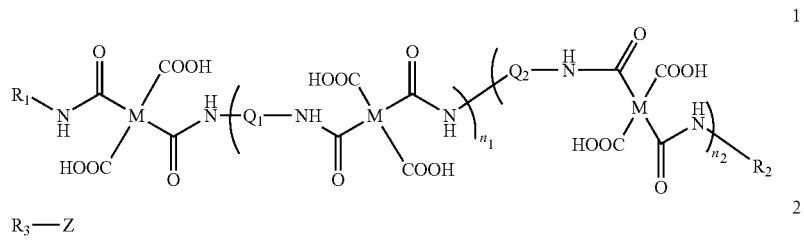

Where M is a tetravalent organic group, which can optionally comprise a polymerization moiety;

$Q_1$ is a divalent organic group optionally substituted with fluorine, chlorine, cyano, alkyl, fluoroalkyl, alkoxy, alkylamino or diallylamino, $Q_2$ is a divalent organic group containing a radical generating moiety, where $n_1/n_2$ is at least 10:1 and $n_1$ is 10-5000.

$R_1$ and $R_2$ are each a divalent or monovalent organic group, each of which can optionally comprise an addition polymerization moiety;

$R_3$ is an addition polymerization moiety independently selected from the group consisting of methacrylates and derivatives, acrylates and derivatives, methacrylamides and derivatives, acrylamides and derivatives, allyl groups and derivatives, vinyl groups and derivatives, styrenes and derivatives, maleimides or maleic anhydrides and derivatives and norbornenes and derivatives; and Z is a monovalent organic group.

$R_1$, $R_2$, $R_3$, M, Q and Z can each independently represent a single chemical structure or a collection of distinct chemical structures.

One skilled in the art will realize that by controlling the formulation of PAA and the conditions of the polymerization between PAA and addition monomer 2 to avoid complete cross-linking of the hybrid polymer, soluble polymers can be obtained and uniform thin films for liquid crystal alignment can be prepared. The addition monomer units and the PAA combine to form a copolymer, which has advantages that prove useful for the invention.

The hybrid polymer prepared from the PAA and addition monomers in the specified weight ratio could comprise amic acid functional groups, which can be further imidized in the presence of acetic anhydride and pyridine. Alternatively, polymerization between PAA and addition monomers can be carried out in the presence of acetic anhydride and pyridine for in situ imidization. Hybrid polymers prepared under in situ imidization condition comprise polyimide backbone.

To prepare the alignment layers the hybrid polymer solutions are coated onto desired substrates. Examples of substrates are glass, quartz, polymer films such as olefin polymers (e.g., polyethylene, polypropylene, norbornene polymers, cycloolefin polymers), polyester polymers (e.g., polyethylene terephthalate, polybutylene terephthalate), polyarylene sulfide polymers (e.g., polyphenylene sulfide), polyvinyl alcohol polymers, polycarbonate polymers, polyarylate polymers, cellulose ester polymers, polyether sulfone polymers, polysulfone polymers, polyallyl sulfone polymers, polyvinyl polymers, triacetyl cellulose and copolymer combinations. Usually, for testing purposes, the substrates have a patterned indium-tin-oxide transparent electrode. Coating is usually accomplished with 1 to 30 wt % solids. Any conventional method may be used to coat the substrates including brushing, spraying, spin-casting, meniscus coating, gravure coating, dipping or flexography printing. The preferred techniques for coating substrates demonstrated in the Examples are spinning and printing. However, the alignment materials of the invention are not limited to use in printing or spinning processes.

The coated substrates can be used as is ("uncured" or "undryed") or heated before processing. When heating is performed, the substrates are heated in an oven in air or under an inert atmosphere, for instance nitrogen or argon, at elevated temperatures usually not exceeding 300° C. and preferably at or below 180° C. for about from 0.25 to 12 hours, preferably for about 2 hours or less. The heating process removes the solvent carrier and may be used to further cure the polymer. For instance, in hybrid polymers where one component is a poly(amic acid) polymer the films can be thermally cured to imidize the poly(amic acid) portion to a polyimide.

The concentration of polymer and choice of solvents can affect the alignment quality, pre-tilt and voltage holding ratio (VHR). These choices affect the film thickness and how the film forms on the substrate, which can lead to differences in alignment quality, pre-tilt and VHR.

Optical alignment layers can be exposed to light to induce alignment of liquid crystals. Polarized light is most preferred. By "polarized light" is meant light that is linearly, elliptically and/or partially polarized such that the light is more polarized along one axis (referred to as the major axis) versus the orthogonal axis (referred to as the minor axis). In this invention the light has one or more wavelengths of about from 150 to 2000 nm and preferably of about from 150 and 1600 nm and more preferably about from 150 to 800 nm. Most preferably, the light has one or more wavelengths of about from 150 to 400 nm, and especially about from 300 to 400 nm. A preferred source of light is a laser, e.g., an argon, helium neon, or helium cadmium. Other preferred sources of light are mercury arc deuterium and quartz tungsten halogen lamps, xenon lamps, microwave excited lamps and black lights in combination with a polarizer. Polarizers useful in generating polarized light from nonpolarized light sources are interference polarizers made from dielectric stacks, absorptive polarizers, wire grids, diffraction gratings and reflective polarizers based on Brewster reflection. With lower power lasers or when aligning small alignment regions, it may be necessary to focus the light beam onto the optical alignment layer.

By "exposing" is meant that light is applied to the entire optical alignment layer or to a portion thereof. The light beam may be stationary or rotated. Exposures can be in one step, in bursts, in scanning mode or by other methods. Exposure times vary widely with the materials used, etc., and can range from less than 1 msec to over an hour. Exposure may be conducted before or after contacting the optical alignment layer with the liquid crystal medium. Exposing can be accomplished by light transmitted through at least one mask having a pattern or with a beam of light scanned in a pattern. Exposing may be accomplished using interference of coherent optical beams forming patterns.

Exposing also can consist of two or more exposure steps wherein the conditions of each step such as angle of incidence, polarization state, energy density, and wavelength are changed. Exposures can also be localized to regions much smaller than the substrate size to sizes comparable to the entire substrate size.

Exposure energy requirements vary with the formulation and processing of the optical alignment layer prior to and during exposure. A preferred range of exposure energy is about from 0.001 to 100 $J/cm^2$ and most preferred range of exposure energy is about from 0.001 to 5 $J/cm^2$. Lower exposure energy is most useful in large scale manufacturing of optical alignment layers and liquid crystal display elements. Lower exposure energy also minimizes the risk of damage to other materials on the substrates.

The quality of alignment and electrical properties of the liquid crystal cell assembled from exposed substrates can be improved by heating the substrates during exposure and/or after exposure but prior to assembly and/or filling of the cell. This additional heating of the substrates is not a requirement of the process but can give beneficial results.

Applying a liquid crystal medium to the alignment layer can be accomplished by capillary filling of a cell, by casting of a liquid crystal medium onto an alignment layer, by laminating a preformed liquid crystal film onto an alignment layer or by other methods. Preferred methods are capillary filling of a cell, injection filling and casting of a liquid crystal medium onto an alignment layer. Alignment layers can be pre-exposed to light or they can be exposed after contacting the liquid crystal medium.

For optical alignment layers, the type of photochemistry that occurs and the molecular structure of the liquid crystal determine the alignment direction of the liquid crystal medium. The alignment of the liquid crystal medium is often described relative to the dominant polarization of the polarized light in the plane of the optical alignment layer during exposure of the coated substrates. The liquid crystal medium is said to align "parallel" or "perpendicular" when the liquid crystal molecules are found to align predominately parallel or perpendicular to the dominant polarization of the light in the plane of the coated substrates, respectively. For some materials, exposure with unpolarized light leads to an anisotropy along the predominant direction of propagation of light. In some cases, this is sufficient to lead to alignment of the liquid crystal medium. Another class of alignment is homeotropic or vertical where the liquid crystal molecules align predominantly perpendicular to the substrate. Several photochemical mechanisms are possible in many hybrid polymers and the predominant ones can be determined by film forming and exposure conditions (e.g., the temperature and atmosphere the films are exposed to prior to exposure, the temperature and atmosphere under which the exposure is performed, and the exposure energy density). The hybrid polymers can exhibit parallel, perpendicular or vertical alignment depending on which photochemical mechanism dominates and the liquid crystal molecular structure.

Hybrid polymers are not limited to use in optical alignment layers. Hybrid polymers can be mechanically rubbed and used as a conventional alignment layer. Some hybrid polymers of the invention can exhibit vertical alignment without the application of mechanical or optical alignment techniques. Therefore, hybrid polymers of the invention are not limited to use in any one type or class of alignment for liquid crystal devices.

A cell can be prepared by using two coated substrates to provide a sandwiched layer of liquid crystal medium. It is anticipated that at least one of the alignment layers in the cell will be comprised of the hybrid polymers of the invention. The alignment layer comprising hybrid polymers of the invention can be a conventional rubbed alignment layer, vertical alignment layer or optical alignment layer. The pair of substrates can both contain optical alignment layers or a conventional alignment layer (e.g., mechanically rubbed or vertical alignment) can be used as the second alignment layer comprising the same or a different polymer, or a conventional alignment layer can be used for both alignment layers, as in the case of mechanically rubbed or vertical alignment cells.

Liquid crystal substances for use with liquid crystal optical elements include, nematic liquid crystal substances, ferroelectric liquid crystal substances, vertical alignment liquid crystals (negative dielectric liquid crystals), in-plane-switching, etc. Useful liquid crystals for the invention described herein include positive dielectric liquid crystals including 4-cyano-4'-alkylbiphenyls, 4-cyano-4'-alkyloxybiphenyls, 4-alkyl-(4'-cyanophenyl)cyclohexanes, 4-alkyl-(4'cyanobiphenyl)cyclohexanes, 4-cyanophenyl-4'-alkylbenzoates, 4-cyanophenyl-4'alkyloxybenzoates, 4-alkyloxyphenyl-4'-cyanobenzoates, 4-alkylphenyl-4'alkylbenzoates, 1-(4'-alkylphenyl)-4-cyanopyrimidines, 1-(4'-alkyloxyphenyl)-4-cyanopyrimidines and 1-(4-cyanophenyl)-4-alkylpyrimidines. Other useful liquid crystals are new superfluorinated liquid crystals available from EM Industries, (Hawthorne N.Y.) including the commercial materials: ZLI-5079, ZLI-5080, ZLI-5081, ZLI-5092, ZLI-4792, ZLI-1828, MLC-2016, MLC-2019, MLC-6252 and MLC-6043. Other useful nematic materials for practicing the invention include the commercial liquid crystals available from Dinippon Ink and Chemicals, Inc. (Tokyo, Japan) including the DLC series: 22111, 22112, 22121, 22122, 23070, 23170, 23080, 23180, 42111, 42112, 42122, 43001, 43002, 43003, 63001, 63002, 63003, 63004, and 63005. Some useful in-plane-switching liquid crystals include MLC-2041 and MLC-2042 and, for vertical alignment liquid crystals there is MLC-6608. All are available from EM Industries, (Hawthorne, N.Y.)

Polymerizable liquid crystal monomers, or reactive mesogens, also are useful in the invention. Reactive liquid crystal mesogens include nematic liquid crystals, discotic liquid crystals, smectic liquid crystals and cholesteric liquid crystals. Preferred are those disclosed in U.S. Pat. No. 5,846,452, hereby incorporated by reference. The invention is not limited to the use of liquid crystals defined above. One skilled in the art will recognize that the invention will be of value with many diverse liquid crystal structures and formulations containing mixtures of liquid crystals.

The exposed optical alignment layer induces alignment of a liquid crystal medium at an angle with respect to the major axis of the polarization of the incident light beam and along the surface of the optical alignment layer. One skilled in the art will recognize that the process allows control of the alignment of a liquid crystal medium in any desired direction in and out of the plane of the optical alignment layer by controlling the conditions of the light exposure.

One example of a liquid crystal display element of the invention is composed of an electrode substrate having at least one hybrid polymer alignment layer of the invention, a voltage-impressing means and a liquid crystal material. FIG. 1 illustrates a typical liquid crystal display element, comprising a transparent electrode 2 of ITO (indium-tin oxide) or tin oxide on a substrate 1 and optical alignment layers 3 formed thereon. The optical alignment layers are exposed to polarized light of a wavelength or wavelengths within the absorption band of the anisotropically absorbing molecules. A spacer concurrently with a sealing resin 4 is intervened between a pair of optical alignment layers 3. A liquid crystal 5 is applied by capillary filling of the cell and the cell is sealed to construct a liquid crystal display element. Substrate 1 may comprise an overcoat film such as an insulating film, a color filter, a color filter overcoat, a laminated polarizing film etc. These coatings and films are all considered part of the substrate 1. Further, active elements such as thin film transistors, a nonlinear resistant element, etc. may also be formed on the substrate 1. These electrodes, undercoats, overcoats, etc. are conventional constituents for liquid crystal display elements and are usable in the display elements of this invention. Using the thus formed electrode substrate, a liquid crystal display cell is prepared, and a liquid crystal substance is filled in the space of the cell, to prepare a liquid crystal display element in combination with a voltage-impressing means.

Alignment layers of the invention are compatible with all liquid crystal display modes. A liquid crystal display element of the invention can comprise a variety of display configurations including twisted nematic, super twisted nematic, optically compensated bend, in-plane-switching, vertical alignment, active-matrix, cholesteric, polymer dispersed, ferroelectric, anti-ferroelectric and multi-domain liquid crystal displays. Although the display modes demonstrated in this specification are primarily twisted nematic and vertical alignment, the alignment layers of the invention are not limited to use in twisted nematic liquid crystal or vertical alignment displays. In addition, the majority of alignment layers demonstrated in this specification are optical alignment layers. However, the alignment layers of the invention are not limited to optical alignment layers.

Alignment layers of the invention are useful in aligning reactive mesogens to form optical films such as phase compensation films or retardation films for improving the optical performances of LCDs in wider viewing angles, better contrast and better color displays. Reactive mesogens are coated on the alignment layer and aligned. Polymerization and/or crosskicking of the aligned mesogens are achieved by radiation, such as ultraviolet light or electron beam. The cured polymeric liquid crystal optical films are incorporated in LCDs for better optical performances.

Patterned optical films made with reactive mesogens can be formed using patterned alignment layers. Examples are those disclosed in U.S. Pat. No. 5,073,294 hereby incorporated by reference. One skilled in the art will recognize that the invention will be of value with many diverse optical film structures and patterns. Patterned optical films have many applications such as for stereoscopic displays and anti-counterfeiting labels Alignment layers of the invention are useful in many other liquid crystal devices other than liquid crystal displays. These include electro-optical light modulators, all-optical light modulators, erasable read/write optical data storage media; diffractive optical components such as gratings, beamsplitters, lenses (e.g., Fresnel lenses), passive imaging systems, Fourier processors, optical disc and radiation collimators; binary optical devices formed by combining refractive and diffractive optics including eyeglasses, cameras, night vision goggles, robotic vision and three-dimensional image viewing devices; and holographic devices such as heads-up displays and optical scanners.

Voltage Holding Ratio (VHR) is a critical electrical parameter for liquid crystal displays. VHR is a measure of the LCDs ability to retain a voltage during the time between pixel updates (frame time). The type of liquid crystal, alignment layers and cell geometry can all affect the measured VHR value. In the examples to follow, liquid crystal test cells comprising soda-lime substrates with patterned indium-tin-oxide (ITO) transparent electrodes are described. The overlap of the electrodes was about 1 cm² after the test cell was assembled. Approximately 2-3 inch wire leads were attached to the patterned ITO electrodes using an ultrasonic solder iron after the test cell is assembled but prior to filling. The leads were attached to a VHR measurement system (Elsicon VHR-100 Voltage Holding Ratio Measurement System, Newark, Del.) using test clips after the cell was filled and annealed. The VHR for the examples was measured for a 20 msec frame time, 1 volt applied signal, at room temperature and 75° C.

The following Examples are meant to illustrate the invention and are not meant to be limiting:

Examples 1-7 describe the synthesis of novel Addition Monomers for use in hybrid polymers of the invention.

EXAMPLE 1

The following example describes the synthesis of novel Addition Monomer 1 for use in the preparation of hybrid polymers of the invention.

3-[4-(6-Hydroxy-hexyloxy)-phenyl]-acrylic acid methyl ester

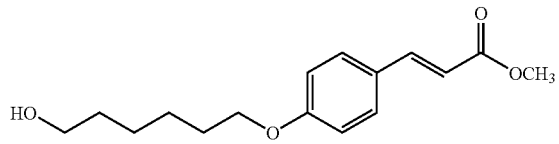 [SMILES: COC(=O)/C=C/c1ccc(OCCCCCCO)cc1]

Methyl 4-hydroxy cinnamate (40 g, 225 mmol) was dissolved in 1-methyl-2-pyrrolidinone (NMP, 300 mL). 6-Chlorohexanol (269 mmol, 36.8 g), anhydrous $K_2CO_3$ (37.2 g, 269 mmol) and catalytic amount of KI were added. The batch was stirred at 90° C. for 32 hours. Water was added to the cooled solution, which was subsequently extracted with ethyl acetate (EtOAc, 3×200 mL). The combined organics were washed with 10% KOH (2×100 mL), brine solution and then dried over $MgSO_4$. The concentrated product was then recrystallized from a 1:1 mixture of EtOAc/hexanes to give 45 g (72% yield) of an off-white solid.

2-Methyl-acrylic acid 6-[4-(2-methoxycarbonyl-vinyl)-phenoxy]-hexyl ester, Addition Monomer 1

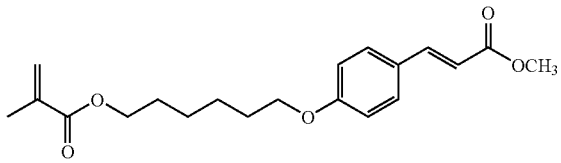 [SMILES: C=C(C)C(=O)OCCCCCCOc1ccc(/C=C/C(=O)OC)cc1]

To an ice-cooled solution of 3-[4-(6-hydroxy-hexyloxy)-phenyl]-acrylic acid methyl ester (20 g, 72 mmol), triethylamine ($Et_3N$, 11.7 g,116 mmol)) and 4 crystals of 2,6-di(tert-butyl-4-methylphenol (BHT) in 150 mL of $CH_2Cl_2$ was added dropwise 11.3 g (108 mmol) of methacryloyl chloride in 5 mL of $CH_2Cl_2$. The mixture was allowed to react for 2 hours, at which time $CH_2Cl_2$ was removed under reduced pressure. The mixture was partitioned between water (100 mL) and EtOAc (3×100 mL). The combined organic layers were washed with 100 mL portions of 1M HCl, water, 5% $NaHCO_3$ and brine

EXAMPLE 2

The following example describes the synthesis of novel Addition Monomer 2 for use in the preparation of hybrid polymers of the invention.

2-Methyl-acrylic acid 6-[3-(4-methoxy-phenyl)-acryloyloxy]-hexyl ester, Addition Monomer 2

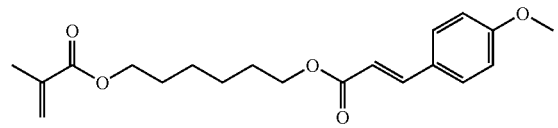 [SMILES: C=C(C)C(=O)OCCCCCCOC(=O)/C=C/c1ccc(OC)cc1]

A 1-L round-bottom (RB) flask was charged with K$_2$CO$_3$ (77.5 g, 0.561 mol), a stir-bar, catalytic amount of KI (0.93 g, 5.61 mmol) and N,N-dimethylformamide (DMF,500 mL), followed by the addition of 4-methoxycinnamic acid (100 g, 0.561 mol). The resulting suspension was stirred at ambient temperature while 6-chloro-1-hexanol (84.34 g, 0.617 mol) was added. The flask was then equipped with a H$_2$O condenser and the reaction mixture was warmed at 90° C. under N$_2$ for 36 h.

The mixture was then poured into H$_2$O (1000 mL) and extracted with EtOAc (2×500 mL). The organic layer was washed with 5% KOH solution (300 mL), H$_2$O (300 mL), brine (2×100 mL) and dried over MgSO$_4$ (100 g). The solid was filtered off with a Büchner filter funnel and rinsed with additional EtOAc (200 mL). The combined filtrate was concentrated by rotary evaporation and the residue was further dried in vacuo for 24 h at 40° C. to yield a light yellow oil [3-(4-Methoxy-phenyl)-acrylic acid 6-hydroxy-hexyl ester] (125·140 g, 80·90% yield). The oil (100 g, 0.36 mol) was mixed with tetrahydrofuran (THF,400 mL) and Et$_3$N (60 mL, 0.432 mol) in a 1-L RB flask. The solution was stirred under N$_2$ in an ice bath after a few crystals of BHT (anti-oxidant) were introduced as polymerization inhibitor. Freshly distilled methacryloyl chloride (37.1 mL, 0.38 mol) was added via an addition funnel dropwise. The white suspension was stirred at ambient temperature for 2 h under N$_2$ atmosphere before it was poured into H$_2$O (300 mL) and extracted with hexanes (200 mL). The aqueous layer was extracted once with EtOAc/hexanes (1:4, 200 mL). The combined extracts were concentrated by rotary evaporation to a yellow oil (~140 g). The oil was mixed with EtOAc/hexanes (1:9, 500 mL), washed with H$_2$O (100 mL), 5% KOH (100 mL), 1 M HCl (100 mL), brine (2×100 mL) and then dried over MgSO$_4$ (30 g). The solid was filtered off with a SiO$_2$ plug (300 g) in a Büchner filter funnel and rinsed with additional EtOAc/hexanes (1:9, 1500 mL) to elute off the product. The combined filtrate was concentrated by rotary evaporation and the residue was further dried in vacuo for 16 h to yield a light yellow oil/solid (110~120g), which could be further purified by re-crystallization from 5% EtOAc in hexanes to afford white crystals of Addition Monomer 2.

EXAMPLE 3

The following example describes the synthesis of novel Addition Monomer 3 for use in the preparation of hybrid polymers of the invention.

2-Methyl-acrylic acid 6-[3-(3,4-dimethoxy-phenyl)-acryloyloxy]-hexyl ester, Addition Monomer 3

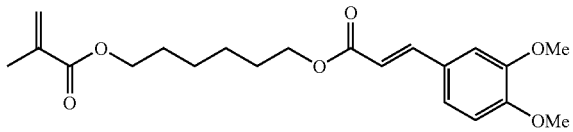 [SMILES: C=C(C)C(=O)OCCCCCCOC(=O)/C=C/c1ccc(OC)c(OC)c1]

A 1-L RB flask was charged with K$_2$CO$_3$ (18.243 g, 0.1321 mol), a stir-bar, catalytic amount of KI (0.60 g, 3.60 mmol) and DMF (300 mL), followed by the addition of 3,4-dimethoxycinnamic acid (25.0 g, 0.1201 mol). The resulting suspension was stirred at ambient temperature while 6-chloro-1-hexanol (18.03 g, 0.1321 mol) was added. The flask was then equipped with a H$_2$O condenser and the reaction mixture was warmed at 90° C. under N$_2$ for 24 h. The reaction mixture started as solid chunk and it slowly became a light yellow slurry.

The mixture was then poured into H$_2$O (400 mL) and extracted with EtOAc (3×100 mL). The combined extracts were dried over Na$_2$SO$_4$ (30 g). The solid was filtered off with a Büchner filter funnel and rinsed with additional EtOAc (200 mL). The combined filtrate was concentrated by rotary evaporation and the residue was further dried in vacuo for 24 h to yield a light yellow solid [3-(3,4-dimethoxy-phenyl)-acrylic acid 6-hydroxy-hexyl ester] (40.56 g).

The solid (40.56 g, 0.1201 mol theoretical) was mixed with THF (150 mL) and Et$_3$N (20.1 mL, 0.144 mol) in a 1-L RB flask. The solution was stirred under N$_2$ in an ice bath after a few crystals of BHT (full chemical name) were introduced as polymerization inhibitor. Freshly distilled methacryloyl chloride (12.32 mL, 0.1201 mol) was added via an addition funnel dropwise. The white suspension was stirred at ambient temperature for 2 h under N$_2$ atmosphere before it was poured into H$_2$O (300 mL) and extracted with EtOAc/hexanes (1:1, 3×150 mL). The combined extracts were concentrated by rotary evaporation to a yellow oil, which was purified by flash column chromatography (SiO$_2$, 100 g, EtOAc/hexanes 1:4). The fractions containing the desired product were combined and concentrated to a light yellow oil (47.2 g). To the oil was added EtOAc/hexanes (1:9, 70 mL) to yield a slightly hazy solution. The flask was capped and then placed in a fridge for recrystallization. The solid was filtered and rinsed with EtOAc/hexanes (1:9, ~200 mL) and dried to afford the product as white solid (30.955 g, 68% yield over two steps) of Addition Monomer 3.

EXAMPLE 4

The following example describes the synthesis of novel Addition Monomer 4 for use in the preparation of hybrid polymers of the invention.

4-(6-Hydroxy-hexyloxy)-benzaldehyde

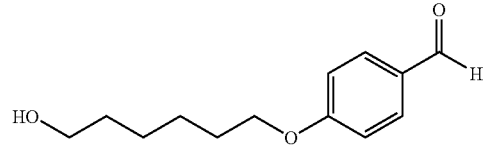 [SMILES: O=Cc1ccc(OCCCCCCO)cc1]

4-Hydroxybenzaldehyde (15 g, 122 mmol) was dissolved in 150 ml of NMP. 6-Chlorohexanol (20.16 g 146 mmol), anhydrous K$_2$CO$_3$ (20.36 g, 146 mmol) and a catalytic amount of KI were added. The batch was stirred at 90 C for 24 hours. Water was added to the cooled solution, which was subsequently extracted with EtOAc (3×100 mL). The combined extracts were washed with 5% KOH (2×100 mL), brine solution and then dried over MgSO$_4$. The concentrated product was then recrystallized from a 1:1 mixture of EtOAc/hexane to give 14 g of an off-white solid.

3-[4-(6-Hydroxy-hexyloxy)-phenyl]-1-(4-iodo-phenyl)-propenone

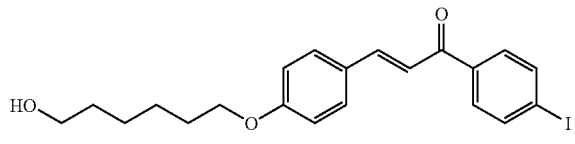 [SMILES: O=C(/C=C/c1ccc(OCCCCCCO)cc1)c1ccc(I)cc1]

4-Iodoacetophenone (2.46 g, 10 mmol) was dissolved in 20 ml toluene. 4-(6-Hydroxyhexyloxy)benzaldehyde (10 mmol, 2.22 g), KOH (15 mmol, 0.84 g in 4 ml water) and Aliquat 336 (0.2 g) were added and the mixture stirred vigorously for 1 h. The formed precipitate was filtered, washed with water and toluene and dried under vacuum, yielding 1.9 g product.

3-[4-(6-Hydroxy-hexyloxy)-phenyl]-1-(4-tridecafluorohexyl-phenyl)-propenone

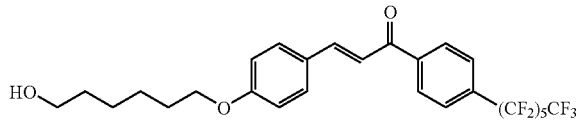

To a solution 3-[4-(6-hydroxy-hexyloxy)-phenyl]-1-(4-iodo-phenyl)-propenone (1.9 g, 4.22 mmol) in anhydrous DMSO (10 mL) was added copper powder (0.67 g, 10.55 mmol), perfluorohexyl iodide (2.35 g, 5.28 mmol) and a catalytic amount of iodine. The reaction mixture was heated to 105° C. for 24 h, cooled, combined with 100 mL of water and 50 mL of EtOAc and filtered to remove insoluble copper salts. The organic and aqueous layers in the filtrate were separated, and the aqueous layer extracted with EtOAc (50 mL). The combined organics were washed with water and brine, dried over MgSO$_4$ and concentrated. Recrystallization from 25% EtOAc in hexane gave 1.6 g of product.

2-Methyl-acrylic acid 6-{4-[3-oxo-3-(4-tridecafluorohexyl-phenyl)-propenyl]-phenoxy}-hexyl ester, Addition Monomer 4

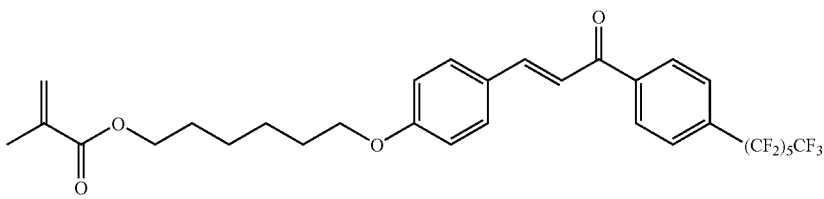

To an ice-cooled solution of 3-[4-(6-hydroxy-hexyloxy)-phenyl]-1-(4-tridecafluorohexyl-phenyl)-propenone (2.3 g, 3.58 mmol), triethylamine (0.58 g, 5.73 mmol) and 4 crystals of BHT in 20 mL of dichloromethane was added dropwise, methacryloyl chloride (0.56 g, 5.73 mmol) in dichloromethane (5 mL). The mixture was allowed to react for 1 hour, at which time the solvent was removed under reduced pressure. The mixture was partitioned between water (50 mL) and ethyl acetate (50 mL) and the aqueous layer subsequently extracted twice more with 50 mL portions of ethyl acetate. The combined organic layers were washed with 50 mL portions of 1M HCl, water, 5% sodium hydrogen carbonate and brine and then dried with magnesium sulfate and concentrated. Recrystallization from ethyl acetate gave 1.2 g of product.

EXAMPLE 5

The following example describes the synthesis of novel Addition Monomer 5 for use in the preparation of hybrid polymers of the invention.

Vitamin E 2-Methyl-acrylate, Addition Monomer 5

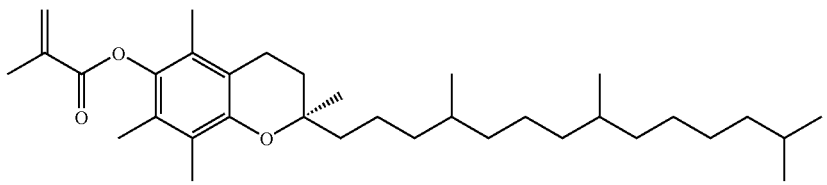 [SMILES: C=C(C)C(=O)Oc1c(C)c(C)c2c(c1C)CC[C@@](C)(CCCC(C)CCCC(C)CCCCC(C)C)O2]

A 250-mL RB flask was charged with vitamin E (6.51 g, 15.11 mmol), a few crystals of BHT (anti-oxidant) and a stir-bar. The flask was sealed with a rubber stopper and flushed with N$_2$ for 10 min before the introduction of THF (100 mL) under N$_2$. The resulting light yellow solution was stirred vigorously and Et$_3$N (3.16 mL, 22.67 mmol) was introduced dropwise via a syringe. Methacryloyl chloride (2.20 mL, 22.67 mmol, newly distilled) was warmed to room temperature (ca. 30 min) and then added to the light yellow solution dropwise via a syringe upon vigorous stirring. After the addition, small amount of white smoke that formed in the flask slowly disappeared. The resulting light yellow solution was wrapped with aluminum foil and stirred at room temperature under N$_2$ for 16 h.

Most THF solvent was removed by rotary evaporation and the residual slurry was mixed with hexanes (100 mL). The mixture was poured into a reparatory funnel with H$_2$O (100 mL). After vigorous shaking for 1 min, the mixture was allowed to separate into two layers. The aqueous layer was discarded and the upper layer was washed with 20% KOH solution (2×50 mL), H$_2$O (2×50 mL), brine (100 mL) and the pH of the final brine wash was 7. The organic layer was transferred to an Erlenmyer flask (500 mL) and dried with anhydrous MgSO$_4$ (30 g) for 20 min after vigorous swirling. The mixture was then filtered with a fitted filter and the solid was further rinsed with 2.5% EtOAc/hexanes solution to bring the total volume to ca. 500 mL. The filtrate was transferred to a RB flask (1000 mL) and concentrated on a rotary evaporator with the bath temperature between 28~30° C. to afford a thick light yellow oil with some floating solid.

The residue was mixed with hexanes (ca. 50 mL) and loaded onto a SiO$_2$ plug (SiO$_2$, 200 g). The plug was first eluted with hexanes (ca. 600 mL). After ca. 400 mL of eluent was collected, 2.5% EtOAc/hexanes was used and the eluent was collected in ca. 250-mL fractions. The fractions containing the desired product as indicated by TLC analysis were combined (ca. 800 mL) and concentrated in vacuo with the exclusion of light to yield Addition Monomer 5 as a pale yellow oil (6.92 g, 94%).

EXAMPLE 6

The following example describes the synthesis of novel Addition Monomer 6 for use in the preparation of hybrid polymers of the invention.

3-[4-(6-Hydroxy-hexyloxy)-phenyl]-acrylic acid

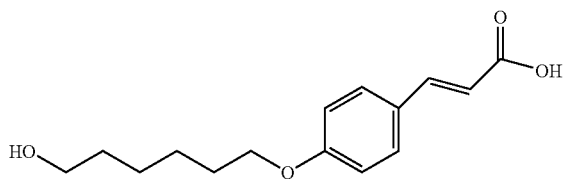 [SMILES: O=C(O)/C=C/c1ccc(OCCCCCCO)cc1]

To a 1L round-bottom flask were added 3-[4-(6-Hydroxy-hexyloxy)-phenyl]-acrylic acid methyl ester (27.82 g, 100 mmol) and MeOH (250 mL) and H$_2$O (80 mL) to render a yellow solution. KOH pellets (8.42 g, 150 mmol) was added in portions. The resulting solution was placed in an oil bath at 50° C. under N$_2$ after the flask was equipped with a water condenser. After 24 h, HPLC analysis indicated more than 95% conversion. The solution was concentrated by rotary evaporation to remove most organic solvent. The remaining solution was diluted with ice cold H$_2$O (400 mL) and cooled in an ice bath. Upon vigorous stirring, concentrated HCl solution (ca. 12 mL) was added dropwise to result in a white slurry (pH 3). The slurry was filtered with a Büchner funnel and the solid was rinsed with additional H$_2$O (ca. 500 mL) and then transferred to a recrystallization dish. After drying overnight in the air, the solid was transferred to an amber bottle, cooled in a dry ice box for 1 h and then lyophilized for 16 h. The hydroxy acid weighed 24.9 g (94% yield).

2-Methyl-acrylic acid
6-[4-(2-hydroxycarbonyl-vinyl)-phenoxy]-hexyl
ester

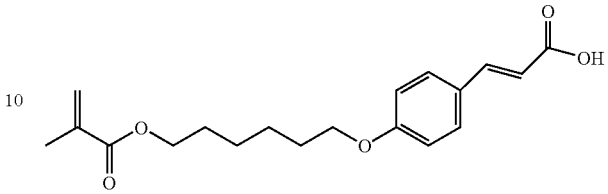

To a 2L round-bottom flask were added powder 3-[4-(6-Hydroxy-hexyloxy)-phenyl]-acrylic acid (63.10 g, 239 mmol), NEt$_3$ (73.3 mL, 526 mmol) and CH$_2$Cl$_2$ (500 mL). The resulting slurry was stirred at room temperature for 1 h to yield a fine suspension. The flask was then placed in an ice bath under N$_2$. Upon vigorous stirring, freshly distilled methacryloyl chloride (47.43 mL, 490 mmol) was added dropwise. The reaction mixture turned into a slightly yellow suspension. After 30 minutes, HPLC indicated the complete consumption of the hydroxy acid.

The solvent was removed by rotary evaporation with bath temperature at 25-30° C. The solid residue was mixed with EtOAc (750 mL) and poured into a 2L separatory funnel with H$_2$O (450 mL). The flask was further rinsed with H$_2$O (100 mL). The mixture was shaken vigorously and after ca. 10 minutes, the aqueous layer was drained and the milky organic layer was transferred to a 2L Erlenmyer flask. The aqueous layer was extracted further with EtOAc (250 mL). The combined extracts were washed with 1 N HCl (150 mL). At this stage, brine (75 mL) was added to break the emulsion. The organic layer was further washed with brine (2×100 mL) and then transferred to a 2L round-bottom flask. The solvent was removed by rotary evaporation to yield a light yellow oil with some solid.

This above material (ca. 100 g) was mixed with CH$_3$CN (400 mL) and 1 N HCl (200 mL). The resulting mixture was placed in an oil bath at 50° C. The flask was further equipped with a H$_2$O condenser and the mixture was stirred vigorously under N$_2$. After 3 h, the flask was removed from the oil bath and stirred to cool in the air to room temperature. After 2 h at room temperature, the white suspension was filtered with a Büchner funnel. The solid was rinsed with H$_2$O (800 mL) and dried in the air overnight, then transferred to an amber bottle, cooled in a dry ice box for 3 h and then lyophilized for 24~48 h. White solid 2-methyl-acrylic acid 6-[4-(2-hydroxycarbonyl-vinyl)-phenoxy]-hexyl ester weighed 56.58 g (71% yield).

2-Methyl-acrylic acid
6-[4-(2-pentoxycarbonyl-vinyl)-phenoxy]-hexyl
ester, Addition Monomer 6

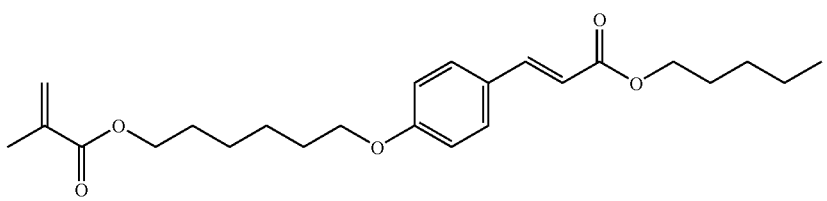 [SMILES: C=C(C)C(=O)OCCCCCCOc1ccc(/C=C/C(=O)OCCCCC)cc1]

To a 250-mL round-bottom flask were added 2-methyl-acrylic acid 6-[4-(2-hydroxycarbonyl-vinyl)-phenoxy]-hexyl ester (4.98 g, 15.0 mmol), 1-pentanol (1.785 mL, 16.5 mmol) and 4-dimethylaminopyridine (DMAP, 92 mg, 0.75 mmol) as solids and a stirbar. The flask was purged with $N_2$, followed by the addition of $CH_2Cl_2$ (35 mL). The suspension was stirred at room temperature for 20 min to give a white slurry. The flask was cooled in an ice bath and N,N'-dicyclohexylcarbodiimide (DCC, 3.25 g, 15.75 mmol) was introduced. The mixture quickly became a light yellow solution, which was then removed from the ice bath and stirred at room temperature. After 20 h, the resulting white slurry was loaded on a $SiO_2$ column (~100 g) for quick purification. The product was eluted off with 10% EtOAc in hexanes. The fractions with the desired product were combined, concentrated and then dried in vacuo to a clear oil, which turned into a white solid (Addition Monomer 6) upon cooling (5.45 g, 90%).

EXAMPLE 7

The following example describes the synthesis of novel Addition Monomer 7 for use in the preparation of hybrid polymers of the invention.

2-Methyl-acrylic acid
6-[4-(2-hexadecyloxycarbonyl-vinyl)-phenoxy]-hexyl ester, Addition Monomer 7

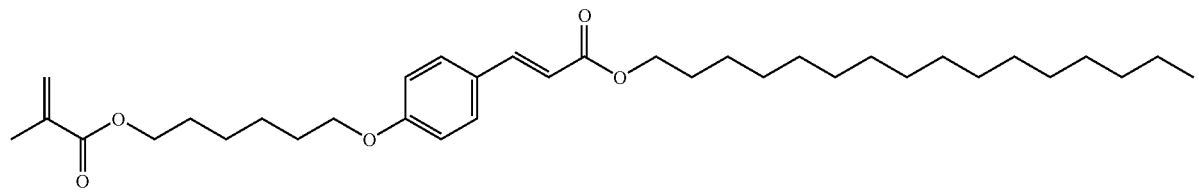 [SMILES: C=C(C)C(=O)OCCCCCCOc1ccc(/C=C/C(=O)OCCCCCCCCCCCCCCCC)cc1]

To a 250-mL round-bottom flask were added 2-methyl-acrylic acid 6-[4-(2-hydroxycarbonyl-vinyl)-phenoxy]-hexyl ester (4.98 g, 15.0 mmol), 1-hexadecanol (4.00 g, 16.5 mmol) and DMAP (92 mg, 0.75 mmol) as solids and a stirbar. The flask was purged with $N_2$, followed by the addition of $CH_2Cl_2$ (35 mL). The suspension was stirred at room temperature for 20 min to give a white slurry. The flask was cooled in an ice bath and DCC (3.25 g, 15.75 mmol) was introduced. The mixture quickly became a light yellow solution, which was then removed from the ice bath and stirred at room temperature. After 20 h, the resulting white slurry was loaded on a $SiO_2$ column (~100 g) for quick purification. The product was eluted off with 10% EtOAc in hexanes. The fractions with the desired product were combined, concentrated and then dried in vacuo to a white solid (7.17 g, 86%) of Addition Monomer 7.

EXAMPLE 8

The following example describes the synthesis of 4-[3-(3-tert-Butoxycarbonylamino-phenoxycarbonyl)-1-cyano-1-methyl-propylazo]-4-cyano-4-methyl-butyric acid 3-tert-butoxycarbonylamino-phenyl ester, Pre-Functionalized Initiator 1

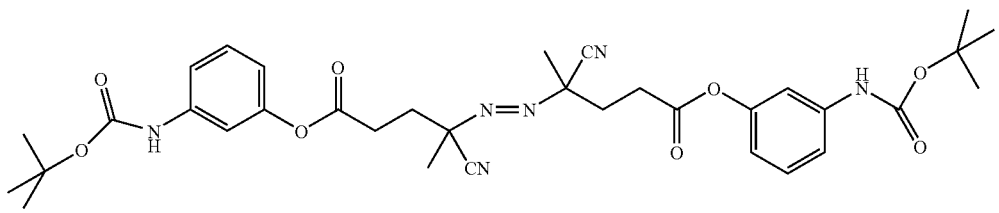 [SMILES: CC(C#N)(CCC(=O)Oc1cccc(NC(=O)OC(C)(C)C)c1)/N=N/C(C)(C#N)CCC(=O)Oc1cccc(NC(=O)OC(C)(C)C)c1]

Solid 4,4'-azobis(4-cyanovaleric acid) (2.512 g, 8.96 mmol), N-Boc-3-aminophenol (3.746 g, 17.92 mmol) and 4-dimethylaminopyridine (0.219 g, 1.792 mmol) were introduced to a round-bottom flask under $N_2$, followed by the introduction of $CH_2Cl_2$ (80 mL). The mixture was stirred at ambient temperature for 1 h to yield a white slurry, which was subsequently cooled in an ice bath prior to the addition of DCC (4.067 g, 19.71 mmol). The flask was then covered with Aluminum foil to exclude light. After 3 h, the white precipitate was filtered off with a Büchner filter funnel. The solid was rinsed with additional $CH_2Cl_2$ (40 mL). The filtrate was concentrated to ca. 40 mL. The concentrated filtrate was loaded onto a silica gel column ($SiO_2$, 80 g) and eluted with $CH_2Cl_2$ and then 5% $CH_3CN$ in $CH_2Cl_2$. The fractions containing the desired product (Pre-Functionalized Initiator 1) were combined and concentrated to a white solid (4.907 g, 82% yield), which was stored at 4° C. prior to use.

The following Examples 9, 10, 13, 14 and 18 are paper examples that have been included to describe the manner and process of making various embodiments of the invention.

EXAMPLE 9

The Following Example is Simulated and Describes the Synthesis of N-(tert-butoxycarbonyl)glycine N-(tert-butoxycarbonyl) glycyloxyethyleneaminocarbonyl)-isopropylazo]-isobutyramidoethyl ester, Pre-Functionalized Initiator 2

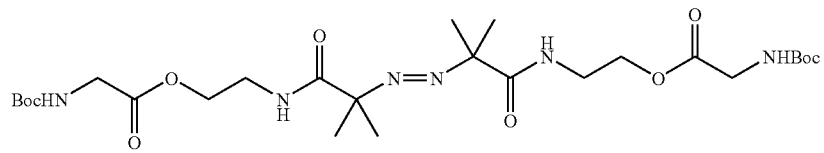 [SMILES: CC(C)(C)OC(=O)NCC(=O)OCCNC(=O)C(C)(C)/N=N/C(C)(C)C(=O)NCCOC(=O)CNC(=O)OC(C)(C)C]

2,2'-azobis[N-(2-hydroxyethyl)isobutyramide] (VA-086, Wako Pure Chemical Industries, Ltd.) (3.60 g, 12.50 mmol), N-(tert-butoxycarbonyl)glycine (4.818 g, 27.50 mmol) and 4-dimethylaminopyridine (0.336 g, 2.75 mmol) are introduced to a round-bottom flask under $N_2$, followed by the introduction of anhydrous THF (120 mL). The mixture is stirred at ambient temperature for 1 h to yield a white slurry, which is subsequently cooled in an ice bath prior to the addition of DCC (5.674 g, 27.50 mmol). After 24 h at room temperature, the white precipitate is filtered off with a Büchner filter funnel. The solid is rinsed with additional THF (60 mL). The combined filtrate is concentrated to ca. 10 mL before it is diluted with 3% MeOH in $CH_2Cl_2$ (20 mL) and loaded onto a silica gel column ($SiO_2$, 120 g) and eluted with 5% MeOH in $CH_2Cl_2$. The fractions containing the desired product (Pre-Functionalized Initiator 2) are combined and concentrated to a white solid, which is stored at 4° C. prior to use.

EXAMPLE 10

The Following Example is Simulated and Describes the Synthesis of Polyamic acid PAA1

Pre-Functionalized Initiator 1, 4-[3-(3-tert-Butoxycarbonylamino-phenoxycarbonyl)-1-cyano-1-methyl-propylazo]-4-cyano-4-methyl-butyric acid 3-tert-butoxycarbonylaminophenyl ester (0.331 g, 0.50 mmol), is introduced to a 2-neck round-bottom flask and mixed with $CH_2Cl_2$ (2 mL) under $N_2$ with the exclusion of light in an ice bath. To the flask is then added dropwise a pre-mixed solution of trifluoacetic acid (TFA)/$CH_2Cl_2$ (1 mL/1 mL). The resulting solution is stirred for 4 h in an ice bath before most solvent is removed by $N_2$ stream. The residue is further dried in vacuo until the vacuum reaches ~100 mTorr or less. The residue is thus mixed with bis(4-aminocyclohexyl)methane (0.735 g, 3.50 mmol) under $N_2$. Anhydrous 1-methyl-2-pyrrolidinone (NMP, 8.38 mL) is introduced to the mixture to dissolve the solid. After the solution is cooled in an ice bath for 5 minutes, 3,3'4,4'-biphenyltetracarboxylic dianhydride (1.1878 g, 4.04 mmol) is added under $N_2$ to yield a light amber solution, which is stirred for 18 h at ambient temperature. The resulting viscous solution is diluted with DMF (ca. 34 g) to a 5% solution prior to use for radical polymerization with addition monomers.

EXAMPLE 11

The Following Example Describes the Synthesis of Polyamic Acid PAA2

Pre-Functionalized Initiator 1, 4-[3-(3-tert-Butoxycarbonylamino-phenoxycarbonyl)-1-cyano-1-methyl-propylazo]-4-cyano-4-methyl-butyric acid 3-tert-butoxycarbonylaminophenyl ester (0.3319 g, 0.5001 mmol), was introduced to a 2-neck round-bottom flask and mixed with $CH_2Cl_2$ (2 mL) under $N_2$ with the exclusion of light in an ice bath. To the flask was then added dropwise a pre-mixed solution of TFA/$CH_2Cl_2$ (1 mL/1 mL). The resulting solution was stirred for 4 h in an ice bath before most solvent was removed by $N_2$ stream. The residue was further dried in vacuo until the vacuum reached ~100 mTorr. The residue was thus mixed with 4-vinylaniline (0.0715 g, 0.60 mmol), 4,4'-methylenedianiline (1.0302 g, 5.20 mmol) under $N_2$. Anhydrous 1-methyl-2-pyrrolidinone (NMP, 11.40 mL) was introduced to the mixture to yield a light yellow solution. After the solution was cooled in an ice bath for 5 minutes, dianhydride 5-(2,5-dioxotetrahydrol)-3-methyl-3-cyclohexen-1,2-dicarboxylic anhydride (Epiclon B-4400, Chriskev, Inc.) (1.6009 g, 6.051 mmol) was added under $N_2$ to yield a light amber solution, which was stirred for 18 h while the bath slowly warmed to ambient temperature. The resulting viscous solution of PAA2 was diluted with DMF (43.91 g) to a 5% solution of PAA2 and stored in freezer under Ar.

EXAMPLE 12

The Following Example Describes the Synthesis of Polyamic Acid (PAA3)

Pre-Functionalized Initiator 1, 4-[3-(3-tert-Butoxycarbonylamino-phenoxycarbonyl)-1-cyano-1-methyl-propylazo]-4-cyano-4-methyl-butyric acid 3-tert-butoxycarbonylaminophenyl ester (0.6627 g, 1.00 mmol), was introduced to a 2-neck round-bottom flask and mixed with $CH_2Cl_2$ (4 mL) under $N_2$ with the exclusion of light in an ice bath. To the flask was then added dropwise a pre-mixed solution of TFA/$CH_2Cl_2$ (2 mL/2 mL). The resulting solution was stirred for 4 h in an ice bath before most solvent was removed by $N_2$ stream. The residue was further dried in vacuo until the vacuum reached ~100 mTorr. The residue was thus mixed with 1-(N,N-diallylamino)-2,4-diaminobenzene (1.4230 g, 7.00 mmol) under $N_2$. Anhydrous 1-methyl-2-pyrrolidinone (NMP, 13.50 mL) was introduced to the mixture to yield a light yellow solution. After the solution was cooled in an ice bath for 5 minutes, 1,2,3,4-cyclobutanetetracarboxylic dianhydride (1.5846 g, 8.08 mmol) was added under $N_2$ to yield a light amber solution, which was stirred for 18 h while the bath slowly warmed to ambient temperature. The resulting viscous solution was diluted with DMF (ca. 52 g) to a 5% solution (total weight of final solution: 69.402 g) prior to use for radical polymerization with addition monomers.

EXAMPLE 13

The Following Example is Simulated and Describes the Synthesis of Polyamic Acid (PAA4)

Pre-Functionalized Initiator 2, N-(tert-butoxycarbonyl)glycine N-(tert-butoxycarbonyl)glycyloxyethyleneaminocarbonyl)-isopropylazo]-isobutyramidoethyl ester (0.3014 g, 0.50 mmol), is introduced to a 2-neck round-bottom flask and mixes with $CH_2Cl_2$ (2 mL) under $N_2$ with the exclusion of light in an ice bath. To the flask is then added dropwise a pre-mixed solution of $TFA/CH_2Cl_2$ (1 mL/1 mL). The resulting solution is stirred for 4 h in an ice bath before most solvent is removed by $N_2$ stream. The residue is further dried in vacuo until the vacuum reached ~100 mTorr. The residue is thus mixed with 1-(N,N-diallylamino)-2,4-diaminobenzene (0.7115 g, 3.50 mmol) under $N_2$. Anhydrous 1-methyl-2-pyrrolidinone (NMP, 6.63 mL) is introduced to the mixture to yield a light yellow solution. After the solution is cooled in an ice bath for 5 minutes, 1,2,3,4-cyclobutanetetracarboxylic dianhydride (0.7923 g, 4.04 mmol) is added under $N_2$ to yield a light amber solution, which is stirred for 18 h while the bath slowly warms to ambient temperature. The resulting viscous solution is diluted with DMF (ca. 26 g) to a 5% solution prior to use for radical polymerization with addition monomers.

EXAMPLE 14

The Following Example is Simulated and Describes the Preparation of Hybrid Polymer 1
Hybrid Polymer 1

Addition monomer vitamin E 2-methyl-acrylate (~0.035 g) is first dissolved in DMF to yield a 5% stock solution (~0.70 g) in an amber vial. Solid monomer 2-methyl-acrylic acid 6-[4-(2-methoxycarbonyl-vinyl)-phenoxy]-hexyl ester (1.200 g) is introduced to a polymerization flask, followed by the addition of vitamin E 2-methyl-acrylate stock solution (5% in DMF, 0.616 g), PAA1 solution (5% in DMF/NMP, 15.384 g) and DMF (2.80 g). The resulting solution is degassed by three consecutive freeze-pump-thaw cycles, sealed under vacuum and then stirred at 60° C. for 24 h.

The crude reaction mixture is cooled to ambient temperature. The viscous solution is pipetted into EtOAc/hexanes (3:2 v/v, 164 mL in an Erlenmyer flask) dropwise upon vigorous stirring. The reaction flask is further rinsed with DMF (0.5 mL) and the solution is also precipitated. The resulting mixture in the Erlenmyer flask is stirred at ambient temperature for 5 min before the clear supernatant is decanted. The remaining suspension is further rinsed with a mixture solvent of EtOAc/hexanes/DMF (54/36/10 v/v/v, 2×50 mL) and EtOAc/hexanes (3:2 v/v, 2×50 mL). The final suspension is filtered with a Büchner filter funnel. The solid is rinsed with additional EtOAc/hexanes (3:2 v/v, 3×30 mL), transferred to an amber vial and dried in vacuo until the vacuum reaches 55 mTorr or less. The light amber solid obtained is designated as Hybrid Polymer 1. A portion of the solid (0.50 g) is mixed with cyclohexanone (6.6429 g) to result in a 7% stock after tumbling for 18 h. The stock is further diluted with cyclohexanone and ethanol to the desired concentration for spin-coating and/or printing applications.

EXAMPLE 15

The Following Example Describes the Preparation of Hybrid Polymer 2
Hybrid Polymer 2

Addition monomer dodecyl 2-methyl-acrylate (~0.035 g) was dissolved in DMF to yield a 5% stock solution (~0.70 g) in an amber vial. Solid monomer 2-methyl-acrylic acid 6-[3-(4-methoxy-phenyl)-acryloyloxy]-hexyl ester (1.200 g) was introduced to a polymerization flask, followed by the addition of dodecyl 2-methyl-acrylate stock solution (5% in DMF, 0.616 g), PAA2 solution (5% in DMF/NMP, 15.384 g) and DMF (2.80 g). The resulting solution was degassed by three consecutive freeze-pump-thaw cycles, sealed under vacuum and then stirred at 60° C. for 24 h.

The crude reaction mixture was cooled to ambient temperature. The viscous solution was pipetted into EtOAc/hexanes (3:2 v/v, 164 mL in an Erlenmyer flask) dropwise upon vigorous stirring (stirring speed 4). The reaction flask was further rinsed with DMF (0.5 mL) and the solution was also precipitated. The resulting mixture in the Erlenmyer flask was stirred at ambient temperature for 30 min before the clear supernatant was carefully decanted. The remaining suspension was rinsed with a mixture solvent of EtOAc/hexanes/DMF (54/36/10 v/v/v, 2×50 mL) and EtOAc/hexanes (3:2 v/v, 2×50 mL). The final suspension was filtered with a Büchner filter funnel. The solid was rinsed with additional EtOAc/hexanes (3:2 v/v, 3×30 mL), transferred to an amber vial and dried in vacuo until the vacuum reached 55 mTorr or less to give a light amber solid (~1.80 g) (Hybrid Polymer 2). A portion of the solid (0.50 g) was mixed with cyclohexanone (6.6429 g) to result in a 7% stock solution after tumbling for 18 h. The stock solution was further diluted with cyclohexanone and ethanol to the desired concentration for spin-coating and/or printing applications.

EXAMPLE 16

The Following Example Describes the Preparation of Hybrid Polymer 3
Hybrid Polymer 3

Addition monomer dodecyl 2-methyl-acrylate (~0.25 g) was dissolved in DMF to yield a 5% stock solution (~5.00 g) in an amber vial. Solid monomer 2-methyl-acrylic acid 6-[4-(2-methoxycarbonyl-vinyl)-phenoxy]-hexyl ester (3.4440 g) was introduced to a polymerization flask, followed by the addition of dodecyl 2-methyl-acrylate solution (5% in DMF, 4.92 g) and PAA3 solution (5% in DMF/NMP, 46.200 g). Additional DMF (5.436 g) was introduced to the polymerization flask to give the reaction solution a total weight of 60.00 g. The resulting solution was further treated with acetic anhydride ($Ac_2O$, 2.1968 g) and pyridine (3.403 g) before it was degassed by three consecutive freeze-pump-thaw cycles, sealed under vacuum and then stirred at 60° C. for 24 h.

The viscous reaction solution was cooled to ambient temperature, precipitated in EtOAc/hexanes (3:2 v/v, 500 mL) dropwise upon vigorous stirring to yield a slightly hazy suspension. The reaction flask was rinsed with additional DMF (1.0 mL) and the rinsing solution was added to the hazy mixture. After 30 min of stirring, hexanes (200 mL) was added dropwise to the solution to precipitate the product as fluffy solid. The mixture was stirred at ambient temperature for 10 min. After 5 min of standing, the supernatant was decanted. The residue was washed with [(EtOAc/hexanes/DMF)/(108 mL/144 mL/28 mL) (v/v/v), 2×280 mL] and EtOAc/hexanes (3:4 v/v, 2×200 mL) and filtered with a Büchner filter funnel. The solid was further rinsed with EtOAc/hexanes (3:4, 300 mL), transferred to a tared amber vial (40 mL) and dried in vacuo (final vacuum <100 mTorr) to give a light amber solid (5.3083 g, 88.5% yield) (Hybrid Polymer 3). A portion of the solid was mixed with γ-butyrolactone to result in a 7% stock solution after tumbling for at least 18 h at rt. The stock solution was further diluted with γ-butyrolactone to the desired concentration for spin-coating applications.

EXAMPLE 17

The Following Example Describes the Preparation of Hybrid Polymer 4
Hybrid Polymer 4

Addition monomer vitamin E 2-methyl-acrylate (2.4054 g) was dissolved in DMF to yield a 5% stock solution in an amber vial. Monomers 2-methyl-acrylic acid 6-[4-(2-methoxycarbonyl-vinyl)-phenoxy]-hexyl ester (15.81 g) and octadecyl 2-methyl-acrylate (3.00 g) were introduced to a polymerization flask, followed by the addition of vitamin E 2-methyl-acrylate solution (5% in DMF, 46.80 g) and PAA3 solution (5% in DMF/NMP, 177.0 g). Additional DMF (57.39 g) was introduced to the polymerization flask to give the reaction solution a total weight of 300.00 g. The resulting solution was further treated with $Ac_2O$ (8.45 g) and pyridine (13.19 g) before it was degassed by three consecutive freeze-pump-thaw cycles, sealed under vacuum and then stirred at 60° C. for 24 h.

The viscous solution was cooled to ambient temperature, precipitated in EtOAc/hexanes (1:2 v/v, 2.5 L) dropwise upon vigorous stirring to yield a slightly hazy solution. The reaction flask was rinsed with additional DMF (8 mL) and the rinsing solution was added to the hazy mixture. Hexanes (850 mL) was then added dropwise to the solution to precipitate the product as a light amber solid. The mixture was stirred at ambient temperature for 15 min. After 5 min of standing, the supernatant was decanted. The solid was rinsed with EtOAc/hexanes (1:3, 3×300 mL) and filtered with a Büchner filter funnel. The solid was further rinsed with EtOAc/hexanes (1:4, 200 mL), transferred to a tared amber vial and dried in vacuo (final vacuum <100 mTorr) to give a light amber solid (24.92 g, 83% yield) (Hybrid Polymer 4). A portion of the solid (0.8908 g) was mixed with y-butyrolactone (11.8361 g) to result in a 7% stock solution after tumbling for at least 18 h at rt. The stock solution was further diluted with γ-butyrolactone to the desired concentration for spin-coating applications.

EXAMPLE 18

The Following Example is Simulated and Describes the Preparation of Hybrid Polymer 5
Hybrid Polymer 5

Monomer 2-methyl-acrylic acid 6-[3-(4-methoxyphenyl)acryloyloxy]-hexyl ester (1.562 g) is introduced to a polymerization flask, followed by the addition of PAA4 solution (5% in DMF/NMP, 8.76 g). Additional DMF (9.678 g) is introduced to the polymerization flask to give the reaction solution a total weight of 20.00 g. The resulting solution is further treated with $Ac_2O$ (0.42 g) and pyridine (0.653 g) before it is degassed by three consecutive freeze-pump-thaw cycles, sealed under vacuum and then stirred at 80° C. for 24 h.

The viscous solution is cooled to ambient temperature, precipitated in EtOAc/hexanes (1:2 v/v, 167 mL) dropwise upon vigorous stirring to yield a slightly hazy solution. The reaction flask is rinsed with additional DMF (0.5 mL) and the rinsing solution is added to the hazy mixture. Hexanes (55 mL) is then added dropwise to the solution to precipitate the product as a white solid. The mixture is stirred at ambient temperature for 15 min. After 5 min of standing, the supernatant is decanted. The solid is rinsed with EtOAc/hexanes (1:3, 3×50 mL) and filtered with a Büchner filter funnel. The solid is further rinsed with EtOAc/hexanes (1:4, 50 mL), then transferred to a tared amber vial and dried in vacuo (final vacuum <100 mTorr) to give a light amber solid (Hybrid Polymer 5). A portion of the solid (0.8246 g) was mixed with y-butyrolactone (10.9554 g) to result in a 7% stock solution after tumbling for at least 18 h at rt. The stock solution was further diluted with γ-butyrolactone to the desired concentration for spin-coating applications.

EXAMPLE 19

Preparation of Alignment Layer Using Hybrid Polymer 2

A solution for spin-coating was prepared at 1.8% wt of Hybrid Polymer 2 in cyclohexanone/ethanol (cyclohexanone:ethanol 4.2:1). Two 0.9 inch by 1.2 inch by 1 millimeter thick soda lime glass substrates with transparent indium-tin-oxide (ITO) coatings (DCI, Inc. Lenexa, Kans. 66219) were spin-coated with 1.8 wt % Hybrid Polymer 2 in cyclohexanone/ethanol. Spin coating was achieved by filtering the hybrid polymer solution through a 0.45 micron Teflon filter membrane onto the surface of the substrates. The substrates were spun at 2500 RPM for 1 minute to produce uniform thin films. The coated substrates were cured at 100-110° C. for 15 minutes.

The substrates were then exposed to polarized ultraviolet (UV) light in an OptoAlign™ model E3-UV-600-A lamp exposure unit (Elsicon, Inc., Newark, Del.).

After exposure, the substrates were assembled with parallel orientation of the optically generated alignment direction. In this case, the alignment direction was assumed to be parallel to the direction of polarization. The cell thickness was about 3.4 microns. The cell was subsequently capillary filled with nematic liquid crystals suitable for active matrix liquid crystal displays. As expected, the liquid crystals were observed to align in an anti-parallel nematic orientation when viewed between polarizers. Upon annealing the liquid crystal cell above the liquid crystal isotropic point (120° C. for 30 minutes), the uniformity of the alignment was observed to improve.

Pretilt was measured using the PAS-301 measurement system (Elsicon, Inc., Newark, Del.) and VHR was measured using the VHR-100 measurement system (Elsicon, Inc., Newark, Del.) for annealed anti-parallel cells manufactured with the novel Hybrid Polymer 2.

The resulting cell from substrates exposed with 0.61 J/cm² showed good alignment quality, −0.7 degrees pre-tilt and a VHR at 60° C. of 0.96.

EXAMPLE 20

Preparation of Alignment Layer Using Hybrid Polymer 3

A solution for spin-coating was prepared at 4.5% wt of Hybrid Polymer 3 in γ-butyrolactone (BL). Two 0.9 inch by 1.2 inch by 1 millimeter thick soda lime glass substrates with transparent indium-tin-oxide (ITO) coatings (DCI, Inc. Lenexa, Kans. 66219) were spin-coated with 4.5 wt % Hybrid Polymer 3 in BL. Spin coating was achieved by filtering the hybrid polymer solution through a 0.45 micron Teflon filter membrane onto the surface of the substrates. The substrates were spun at 2500 RPM for 1 minute to produce uniform thin films. The coated substrates were cured at 80° C. for 10 minutes.

The substrates were then exposed to polarized ultraviolet (UV) light in an OptoAlign™ model E3-UV-600-A lamp exposure unit (Elsicon, Inc., Newark, Del.).

After exposure, the substrates were heated at 180° C. for one hour. The substrates were then assembled with parallel orientation of the optically generated alignment direction. In this case, the alignment direction was assumed to be parallel to the direction of polarization. The cell thickness was about 4 microns. The cell was subsequently capillary filled with nematic liquid crystals suitable for active matrix liquid crystal displays. As expected, the liquid crystals were observed to align in an anti-parallel orientation when viewed between polarizers. Upon annealing the liquid crystal cell above the liquid crystal isotropic point (120° C. for 30 minutes), the uniformity of the alignment was observed to improve.

Pretilt was measured using the PAS-301 measurement system (Elsicon, Inc., Newark, Del.) and VHR was measured using the VHR-100 measurement system (Elsicon, Inc., Newark, Del.) for annealed anti-parallel cells manufactured with the novel Hybrid Polymer 3.

The resulting cell from substrates exposed with 0.61 J/cm$^2$ showed good alignment quality, −1.0 degrees pre-tilt and a VHR at 60° C. of 0.98.

EXAMPLE 21

Preparation of Alignment Layer Using Hybrid Polymer 4

A solution for spin-coating was prepared at 2.5 wt % of Hybrid Polymer 4 in γ-butyrolactone (BL). Two 0.9 inch by 1.2 inch by 1 millimeter thick soda lime glass substrates with transparent indium-tin-oxide (ITO) coatings (DCI, Inc. Lenexa, Kans. 66219) were spin-coated with 2.5 wt % Hybrid Polymer 4 in BL. Spin coating was achieved by filtering the hybrid polymer solution through a 0.45 micron Teflon filter membrane onto the surface of the substrates. The substrates were spun at 2500 RPM for 1 minute to produce uniform thin films.

The coated substrates were cured at 80° C. for 15 minutes. The substrates were then exposed to polarized ultraviolet (UV) light in an OptoAlign™ model E3-UV-600-A lamp exposure unit (Elsicon, Inc., Newark, Del.).

After exposure, the substrates were heated at 180° C. for one hour. The substrates were then assembled with parallel orientation of the optically generated alignment direction. In this case, the alignment direction was assumed to be parallel to the direction of polarization. The cell thickness was about 4 microns. The cell was subsequently capillary filled with nematic liquid crystals suitable for active matrix liquid crystal displays. As expected, the liquid crystals were observed to align in a vertical alignment (VA) orientation when viewed between polarizers. Upon annealing the liquid crystal cell above the liquid crystal isotropic point (120° C. for 30 minutes), the uniformity of the alignment was observed to improve.

Pretilt was measured using the PAS-301 measurement system (Elsicon, Inc., Newark, Del.) and VHR was measured using the VHR-100 measurement system (Elsicon, Inc., Newark, Del.) for annealed VA cells manufactured with the novel Hybrid Polymer 4.

The resulting cell from substrates exposed with 0.61 J/cm$^2$ showed good alignment quality, −89.3 degrees pre-tilt and a VHR at 60° C. of 0.96.

12. The hybrid polymer of claim 11 wherein the azo compounds have the structure of
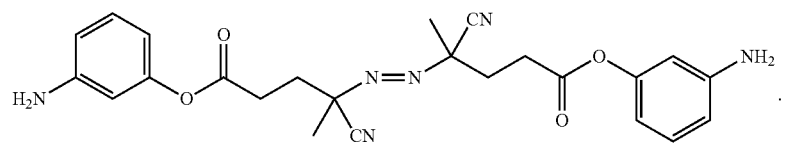

We claim:

1. A hybrid polymer that is prepared from
(a) at least one component selected from the group consisting of oligomer(s) and polymer(s) within the class of polyimides, poly(amic acids) and esters thereof wherein the at least one component comprises at least one initiator generating moiety, and
(b) at least one component selected from the group consisting of addition monomer(s) and addition polymer(s);
wherein the at least one initiator generating moiety of component (a) initiates chain polymerization with at least one component (b) to form a copolymer.

2. The hybrid polymer of claim 1 wherein the at least one component of component (a) comprises at least one addition polymerization moiety.

3. The hybrid polymer of any one of claim 1 or 2 wherein the chain polymerization initiation of the at least one initiator generating moiety is thermally induced.

4. The hybrid polymer of any one of claim 1 or 2 wherein the chain polymerization initiation of the at least one initiator generating moiety is induced by ultraviolet, visible or infrared light.

5. The hybrid polymer of any one of claim 1 or 2 wherein the chain polymerization initiation of the at least one initiator generating moiety is induced by electron beam, ion beam, gamma ray, or other high energy radiation.

6. The hybrid polymer of any one of claim 1 or 2 wherein the chain polymerization initiation of the at least one initiator generating moiety is induced by plasma.

7. The hybrid polymer of any one of claim 1 or 2 wherein the at least one component of component (b) comprises one or more photoreactive groups capable of forming a covalent bond after exposure to light.

8. The hybrid polymer according to any one of claim 1 or 2 wherein the at least one component (b) comprises at least one selected from the group consisting of C4-C24 alkyl chain, C4-C20 fluoroalkyl chain, C4-C20 partially fluorinated alkyl chain and steroidal group.

9. The hybrid polymer of any one of claim 1 or 2 wherein component (a) comprises initiator generating moiety prepared from azo compounds or organic peroxides.

10. The hybrid polymer of claim 9 wherein the azo compounds have the structure of

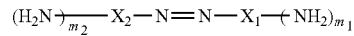

wherein $X_1$, $X_2$ represent mono- or multi-valent organic groups optionally substituted with fluorine, chlorine, cyano, alkyl, fluoroalkyl, alkyoxy; $m_1$, $m_2$ are integral numbers between 0, 1 and 2 and $m_1 + m_2 \geq 1$.

11. The hybrid polymer of claim 10 wherein the azo compounds have the structure of

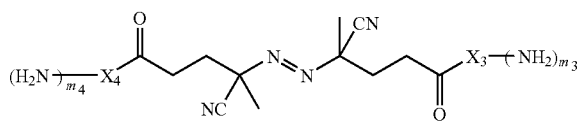

wherein $X_3$, $X_4$ represent mono- or multi-valent organic groups optionally substituted with fluorine, chlorine, cyano, alkyl, fluoroalkyl, alkyoxy; $m_3$, $m_4$ are integral numbers between 0, 1 and 2 and $m_3 + m_4 \geq 1$.